(12) United States Patent
Chang et al.

(10) Patent No.: US 11,209,146 B2
(45) Date of Patent: Dec. 28, 2021

(54) MINIATURIZED STRUCTURED LIGHT PROJECTION MODULE

(71) Applicants: LITE-ON OPTO TECHNOLOGY (CHANGZHOU) CO., LTD., Jiangsu (CN); LITE-ON TECHNOLOGY CORPORATION, Taipei (TW)

(72) Inventors: Yu-Yu Chang, Taipei (TW); Yung-Chang Jen, New Taipei (TW); Chen-Hsiu Lin, New Taipei (TW)

(73) Assignees: LITE-ON OPTO TECHNOLOGY (CHANGZHOU) CO., LTD., Changzhou (CN); LITE-ON TECHNOLOGY CORPORATION, Taipei (TW)

( * ) Notice: Subject to any disclaimer, the term of this patent is extended or adjusted under 35 U.S.C. 154(b) by 349 days.

(21) Appl. No.: 16/252,468

(22) Filed: Jan. 18, 2019

(65) Prior Publication Data

US 2019/0264890 A1 Aug. 29, 2019

Related U.S. Application Data

(60) Provisional application No. 62/634,947, filed on Feb. 26, 2018.

(51) Int. Cl.
*F21V 5/00* (2018.01)
*F21Y 115/30* (2016.01)

(52) U.S. Cl.
CPC ........... *F21V 5/007* (2013.01); *F21Y 2115/30* (2016.08)

(58) Field of Classification Search
CPC . F21V 5/007; F21Y 2115/30; G02B 19/0057; G02B 19/0014; G02B 3/0056; G02B 3/08; G02B 13/008; G02B 13/14; G02B 13/146; G02B 19/009; G01B 11/2513; G06K 9/2036; G06K 2209/401; G06K 9/00221; G03B 21/2033; G03B 21/2013; G03B 21/208; G03B 30/00; C03C 4/10
USPC .......................................................... 359/356
See application file for complete search history.

(56) References Cited

U.S. PATENT DOCUMENTS

| | | | |
|---|---|---|---|
| 9,470,395 B2* | 10/2016 | Marquardt | F21V 13/04 |
| 2002/0014577 A1* | 2/2002 | Ulrich | H01L 21/00 |
| | | | 250/205 |
| 2005/0254127 A1* | 11/2005 | Evans | G02B 27/145 |
| | | | 359/489.18 |
| 2010/0061090 A1* | 3/2010 | Bergman | G02B 27/30 |
| | | | 362/231 |
| 2016/0377414 A1* | 12/2016 | Thuries | G02B 27/1093 |
| | | | 356/625 |
| 2019/0295271 A1* | 9/2019 | Xu | G06K 9/00275 |

* cited by examiner

*Primary Examiner* — Marin Pichler
*Assistant Examiner* — Henry A Duong
(74) *Attorney, Agent, or Firm* — Li & Cai Intellectual Property (USA) Office

(57) ABSTRACT

A miniaturized structured light projection module is provided. The miniaturized structured light projection module includes a light source assembly and a projecting lens. The light source assembly has a plurality of light source units, each of which is provided with a default projected pattern on its surface. The projecting lens is disposed above the light source units. The default projected patterns of the light source units are disposed on a front focal plane of the projecting lens.

18 Claims, 21 Drawing Sheets

MINIATURIZED STRUCTURED LIGHT PROJECTION MODULE

CROSS-REFERENCE TO RELATED PATENT APPLICATION

This application claims priority from the U.S. Provisional Patent Application Ser. No. 62/634,947 filed on Feb. 26, 2018, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a miniaturized structured light projection module used for projecting multiple light dots or stripes, and in particular, to a light projection module applicable to three-dimensional face recognition technology.

BACKGROUND OF THE DISCLOSURE

In the current three-dimensional face recognition technology, a dot projector is used to project multiple infrared dots onto the face of a user; record facial features of the user and return the features according to the displacement distances by which the light dots are reflected back to an infrared camera; and compare the features with a database.

Only a two-dimensional facial color image is acquired by using a common digital camera, while through the three-dimensional face recognition technology, depth information of the face can be additionally obtained, so as to sense a three-dimensional facial structure for recognition. Currently, the three-dimensional recognition technology may include the following two relatively mature solutions: time of flight and structured light.

As for time of flight, after infrared light emitted by a diode illuminates the face, the light is reflected to an infrared image sensor for different time periods due to different height and depth of the facial features. Because the speed of light is constant, the height and depth of the facial features can be deduced based on the differences between the time periods for which the infrared light is reflected to the sensor.

As for structured light, a diode or a digital light source processor emits light rays, and they are diffracted after adjustment by a grating, to produce structured light (in the form of lines, dots or others) to be projected. However, after the face is illuminated, the light is reflected on the basis of the different height and depth of the facial features, to produce different and distorted light rays. The facial structure can be deduced after the distorted light rays are reflected to an infrared image sensor.

A subject to be accomplished in the art is how to reduce the whole size of a device using, particularly, the structured light technique to mount it in a portable electronic product, for example, a mobile phone.

SUMMARY OF THE DISCLOSURE

A technical problem to be solved by the present disclosure is to provide a miniaturized structured light projection module, to reduce the overall size to be mounted in a portable electronic product.

In response to the above-referenced technical inadequacies, the present disclosure provides a miniaturized structured light projection module, which includes a light source assembly and a projecting lens. The light source assembly has a plurality of light source units, each of which is provided with a default projected pattern on its surface. The projecting lens is disposed above the light source units, and is formed by a plurality of lens units, where the lens units are arranged in an array and mutually connected. The projecting lens has a front focal plane, and the default projected patterns of the light source units are disposed on the front focal plane of the projecting lens.

Therefore, the present disclosure achieves the following beneficial effects: The present disclosure can adjust and control a default projected pattern on the surface of a light source, and further use lens units arranged in an array, to reduce the whole size, such that the module can be mounted in a portable electronic product.

In order to further understand the techniques, methods and effects used by the present disclosure to achieve the intended purpose, reference is made to the following detailed description and drawings related to the present disclosure. It is believed that the objectives, features, and characteristics of the present disclosure can be further and specifically understood. However, the drawings and the attachments are provided for reference and description only and are not intended to limit the present disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
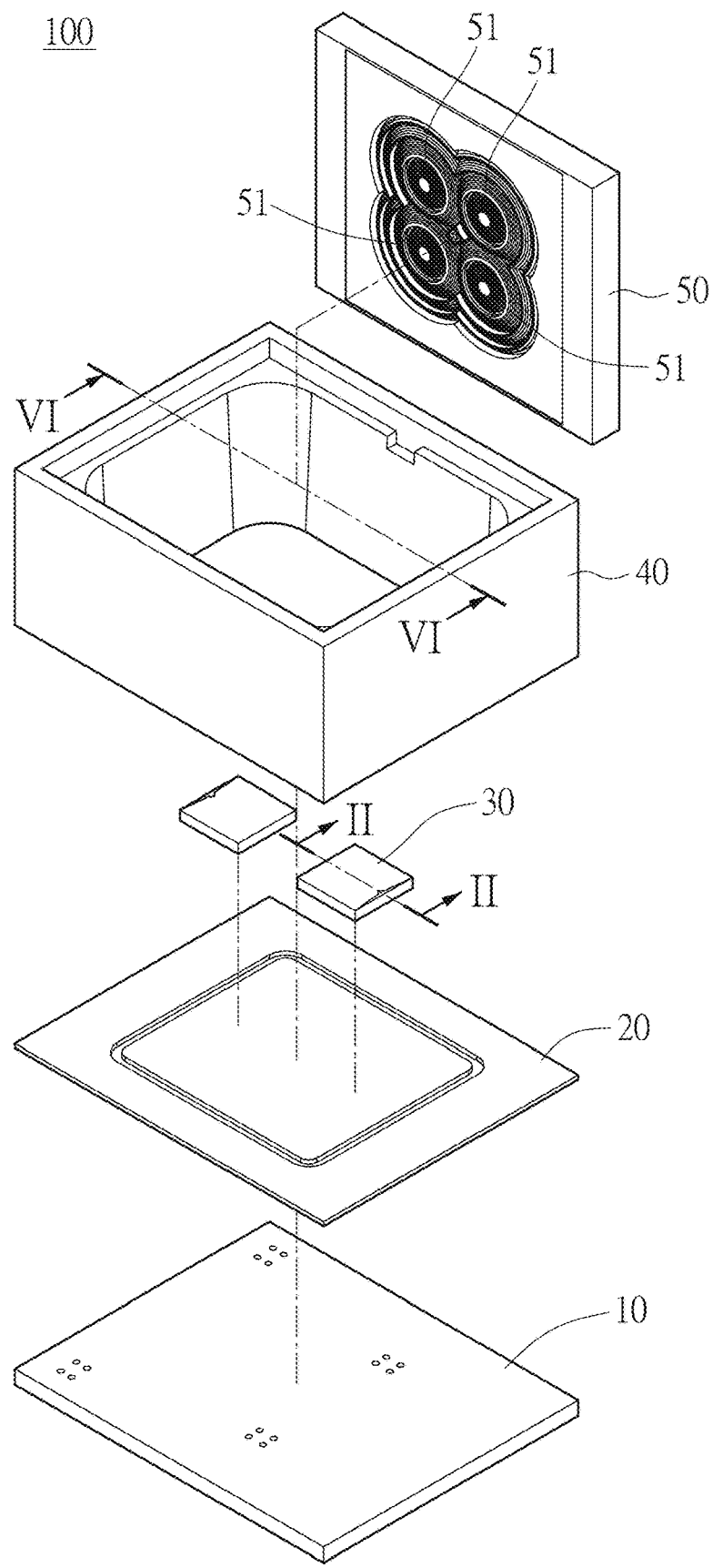
FIG. 1 is an exploded view of a miniaturized structured light projection module of a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1 is an exploded view of a miniaturized structured light projection module of a first embodiment of the present disclosure. A miniaturized structured light projection module 100 includes an additional circuit board 10, a base pad 20, a light source assembly, a reflection casing 40, and a projecting lens 50.

Figure 2:
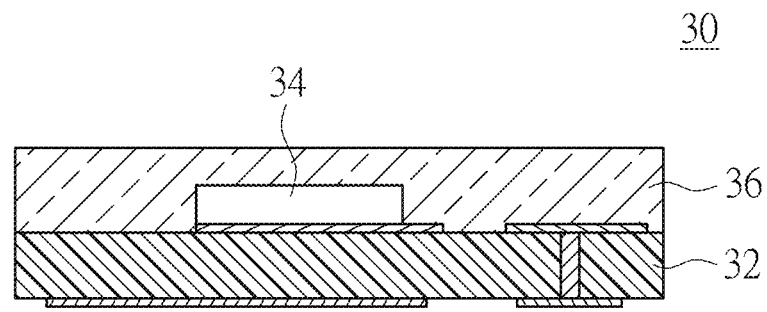
FIG. 2 is a cross-sectional view of a light source unit of the present disclosure.

The light source assembly in this embodiment has a plurality of light source units 30, wherein the light source unit may be a light-emitting chip or a light-emitting package structure. FIG. 2 is a cross-sectional view of a light source unit of the present disclosure. The light source unit 30 in this embodiment may be of a ceramic substrate type. Each light source unit 30 includes a substrate 32, a light-emitting chip 34, and a package 36 covering the light-emitting chip 34. Each light source unit 30 has a default projected pattern which is formed on the surface of the light-emitting chip 34 or the surface of the package 36. An infrared LED chip or a VCSEL (vertical-cavity surface-emitting laser) chip may be used as the light-emitting chip of the present disclosure. Having a small size, a laser diode (which is also referred to as a semiconductor laser diode) chip is applicable to a portable electronic apparatus.

FIG. 2 relates to the light source unit 30 of the present disclosure, and description is made below by using an example. The light-emitting chip 34 is provided on the substrate 32. The default projected pattern may be first formed on the surface of the light-emitting chip 34; and then a thermosetting polymer, for example, an epoxy molding compound (EMC) is used to cover the substrate 32 and the light-emitting chip 34 through a silicone encapsulation molding process, to form the package 36. Specifically, first, a pie-shaped EMC is preheated in a preheater for a period of time. After preset temperature is reached and the EMC is melted, the melted EMC is ejected with a driving screw in a pressurized transmission manner, passes through a runner and a gate, and reaches a mold cavity finally. The entire mold cavity is filled and preliminary packaging is completed after cooling and curing. This manner is also called transfer molding.

Figure 3A:
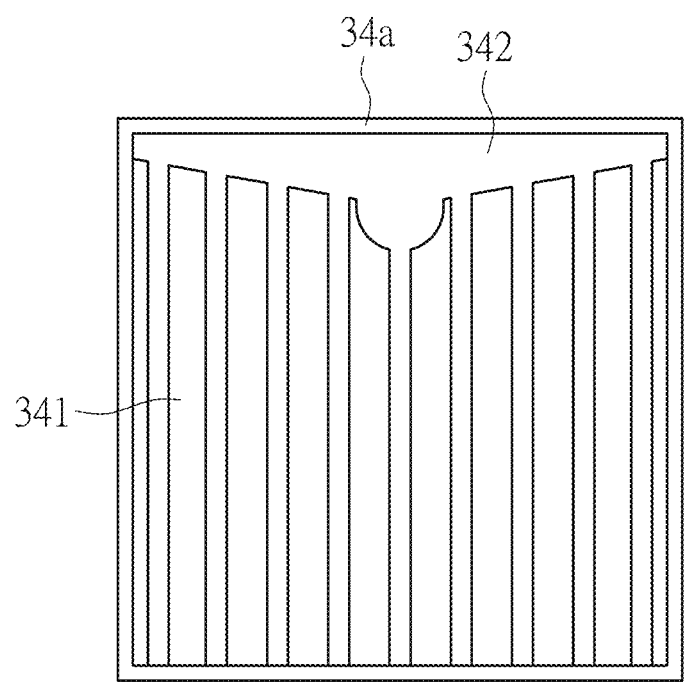
FIG. 3A is a top view of a light-emitting chip in the first embodiment of the present disclosure.

Regarding the implementation that the default projected pattern is formed on the surface of the light-emitting chip, the light-emitting chip may be an infrared light-emitting chip. FIG. 3A shows a light-emitting chip 34a in a first embodiment of the present disclosure. As shown in FIG. 3A, the default projected pattern may be formed by a plurality of straight and parallel stripes (or fingers) 341, and a conducting pad 342 of the light-emitting chip is bar-shaped and located near an upper edge of the light-emitting chip 34a. For example, an infrared light-emitting chip in the size of 42 mil×42 mil may be used in this embodiment. The width of the stripe 341 may range from 0.02 mm to 0.08 mm, and a spacing between edges of edges of the stripes 341 may range from 0.02 mm to 0.08 mm. In other words, a spacing between any adjacent two centers of the stripes 341 may range from 0.04 mm to 0.16 mm.

Figure 3B:
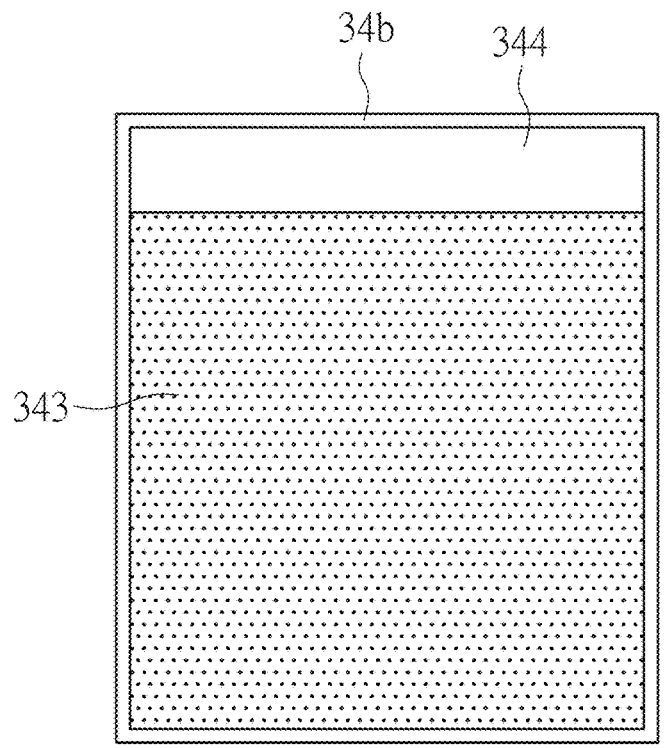
FIG. 3B is a top view of a light-emitting chip in a second embodiment of the present disclosure.

FIG. 3B shows a light-emitting chip 34b in a second embodiment of the present disclosure. As shown in FIG. 3B, the default projected pattern may be formed by vias 343 arranged in an array, and a conducting pad 344 of the light-emitting chip is bar-shaped and located near an upper edge of the light-emitting chip 34b. The default projected pattern may be formed with the vias 343 arranged in an array so that the miniaturized structured light projection module of the present disclosure can be miniaturized. For example, an infrared light-emitting chip in the size of 42 mil×42 mil (milli-inch, denoting one-thousandth of an inch and equal to 0.0254 mm) may be used in this embodiment, wherein the size approximates to 1.067 mm×1.067 mm. In a preferred embodiment, the diameter of each via 343 ranges from 0.02 mm to 0.08 mm, and a spacing between any adjacent two centers of the vias 343 ranges from 0.04 mm to 0.16 mm.

Regarding the implementation that the default projected pattern is formed on the surface of the package 36, after the package 36 covers the substrate 32 and the light-emitting chip 34, the default projected pattern is printed on the surface of the package 36. Alternatively, as for a light source unit 30a provided with a metal support 31 (referring to FIG. 10), after the package 36 covers a casing 33 and the light-emitting chip 34, the default projected pattern is printed on the surface of the package 36.

Figure 3C:
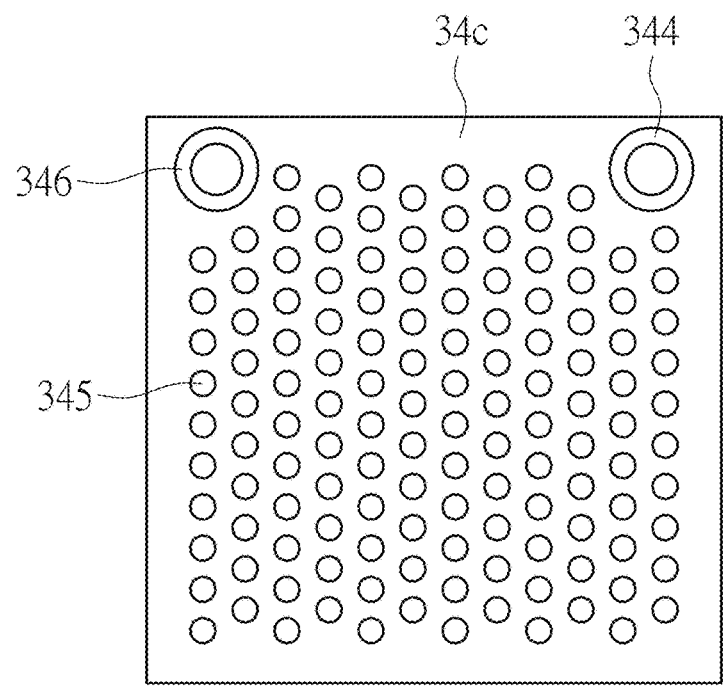
FIG. 3C is a top view of a vertical-cavity surface-emitting laser (VCSEL) chip in a third embodiment of the present disclosure.

FIG. 3C shows a light-emitting chip 34c in a third embodiment of the present disclosure. As shown in FIG. 3C, if the light-emitting chip is a VCSEL chip, the default projected pattern may be formed by apertures 345 arranged in an array. A conducting pad 346 of the light-emitting chip is shaped like a block and located near a corner of the light-emitting chip, and specifically may be a square or round shape.

The structure of the VCSEL chip is described below by using an example. Multiple layers of type-N aluminum gallium arsenide epitaxy are directly grown on a gallium arsenide wafer, where the epitaxy in each layer has a different refractive index; one layer of gallium arsenide epitaxy is then grown as a light emitting region, and multiple layers of type-P aluminum gallium arsenide epitaxy are additionally grown, where the epitaxy in each layer has a different refractive index; and finally, one layer of a metal electrode is separately grown on an upper side and a lower side of the wafer. The default projected pattern may be a circular aperture that is etched in the upper metal electrode through chemical etching, such that a laser can be emitted from the upper side. Emitted from the crystal surface, the laser belongs to a surface emitting laser (SEL).

Regarding the surface of the package 36 formed by the default projected pattern of the light source unit, reference is made to FIG. 3A to FIG. 3C for its shape and quantity.

Figure 4:
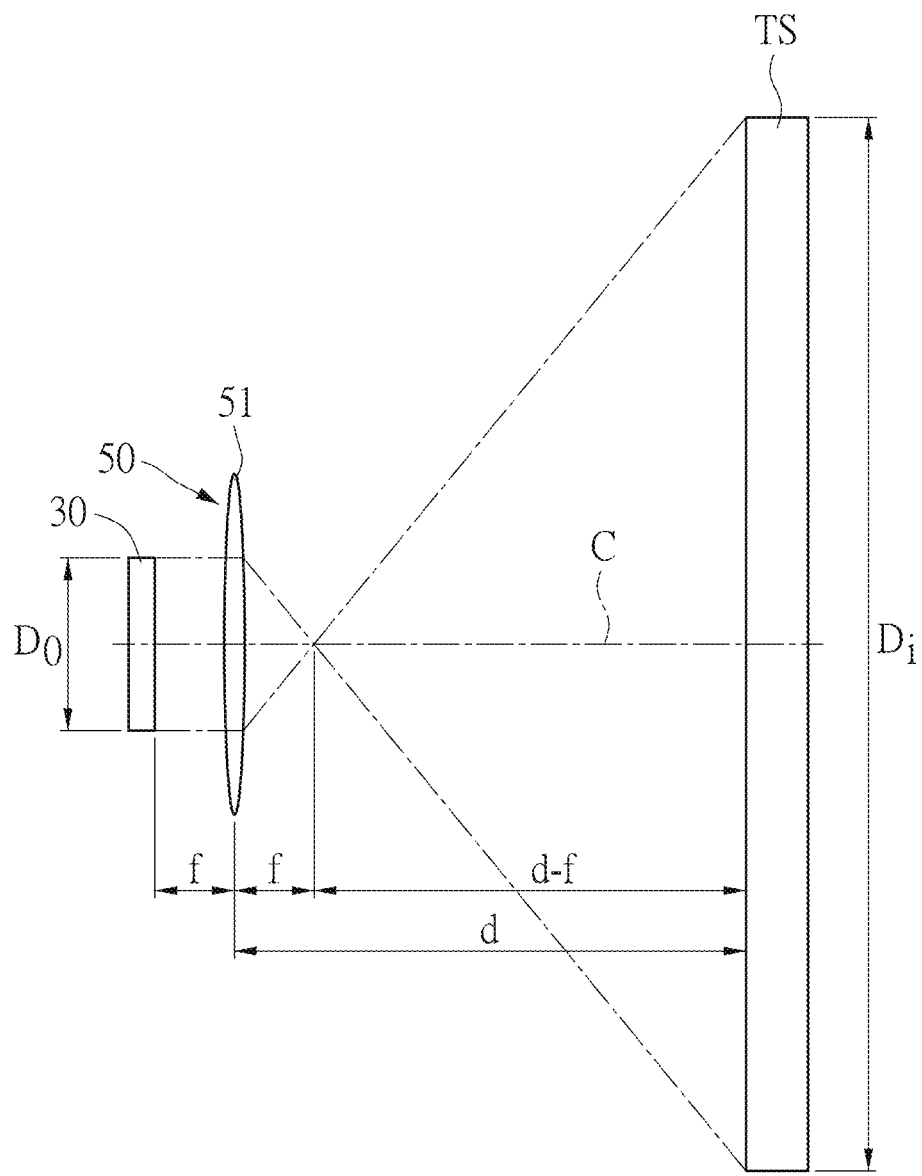
FIG. 4 is a schematic diagram showing that a default projected pattern and a projecting lens are coaxially arranged in the present disclosure.

The projecting lens 50 is disposed above the light source assembly, that is, above the light source units 30. Referring to FIG. 1, the projecting lens 50 in this embodiment is miniaturized, and is preferably formed by four lens units 51. Each lens unit may be a Fresnel lens. The Fresnel lens is thinner than a common lens and has a shorter focal length, which facilitates size reduction in this embodiment. However, in this embodiment, the lens units forming the projecting lens are not limited to the Fresnel lens, and any type of lens of which the focal plane is on the structural plane can be used as the lens unit. The four lens units 51 are arranged in an array and connected to each other. The projecting lens 50 has a front focal plane. The front focal plane refers to a plane having a front focal point (a first focal point or an object focus) and perpendicular to a system principal axis, and is also called a first focal plane or an object focal plane. The default projected pattern of the light source unit is disposed on the front focal plane of the projecting lens 50. In other words, when a preset projected pattern is located on the surface of the light-emitting chip 34, a distance from the surface of the light-emitting chip 34 to the projecting lens 50 is equal to the front focal length (FFL). When the preset projected pattern is located on the surface of the package 36, a distance from the surface of the package 36 to the projecting lens 50 is equal to the FFL, as shown in FIG. 4. According to this embodiment of the present disclosure, the size of the miniaturized structured light projection module can be reduced, but the present disclosure is not limited thereto. For example, a diffractive optical element (DOE) having a preset projected pattern may be disposed on the surface of the package 36. Preferably, the DOE may be omitted in this embodiment, so as to further reduce the overall size.

Referring to FIG. 4, in this embodiment, the default projection patterns and the projecting lens 50 may be coaxially arranged in a one-to-one correspondence manner. That is, the light-emitting chips 34 each having a default projection pattern are disposed on an optical axis C of the projecting lens 50 in a one-to-one correspondence manner. In this embodiment, the optical axis C may be regarded as an optical axis C of one lens unit 51, and the light is projected onto a target screen TS. It is assumed that, the height of the light-emitting chip 34 is $D_0$, the left focal length (the front focal length) and the right focal length of the lens unit 51 are both f, and a projection distance is preset to d. By using a light-emitting chip in the size of 42 mil×42 mil as an example, $D_0$=1.067 mm; the projection distance d is 40 cm by default, d=400 mm; and the focal length f of the lens unit 51 is set to be 4 mm. According to the foregoing relationship, the size $D_i$ of the target screen TS may be calculated by using the following formula:

$$D_i=(d-f)/f \times D_0. \quad \text{Formula (1):}$$

The foregoing data is substituted into formula (1), to obtain $D_i$=(400−4)/4×1.067=105.6 mm. In other words, the size $D_i$ approximates to 10 cm. According to the one-to-one correspondence between the light-emitting chips and the lenses, and with reference to the foregoing assumptions, a square image of 10 cm may be formed on the target screen TS.

Figure 5:
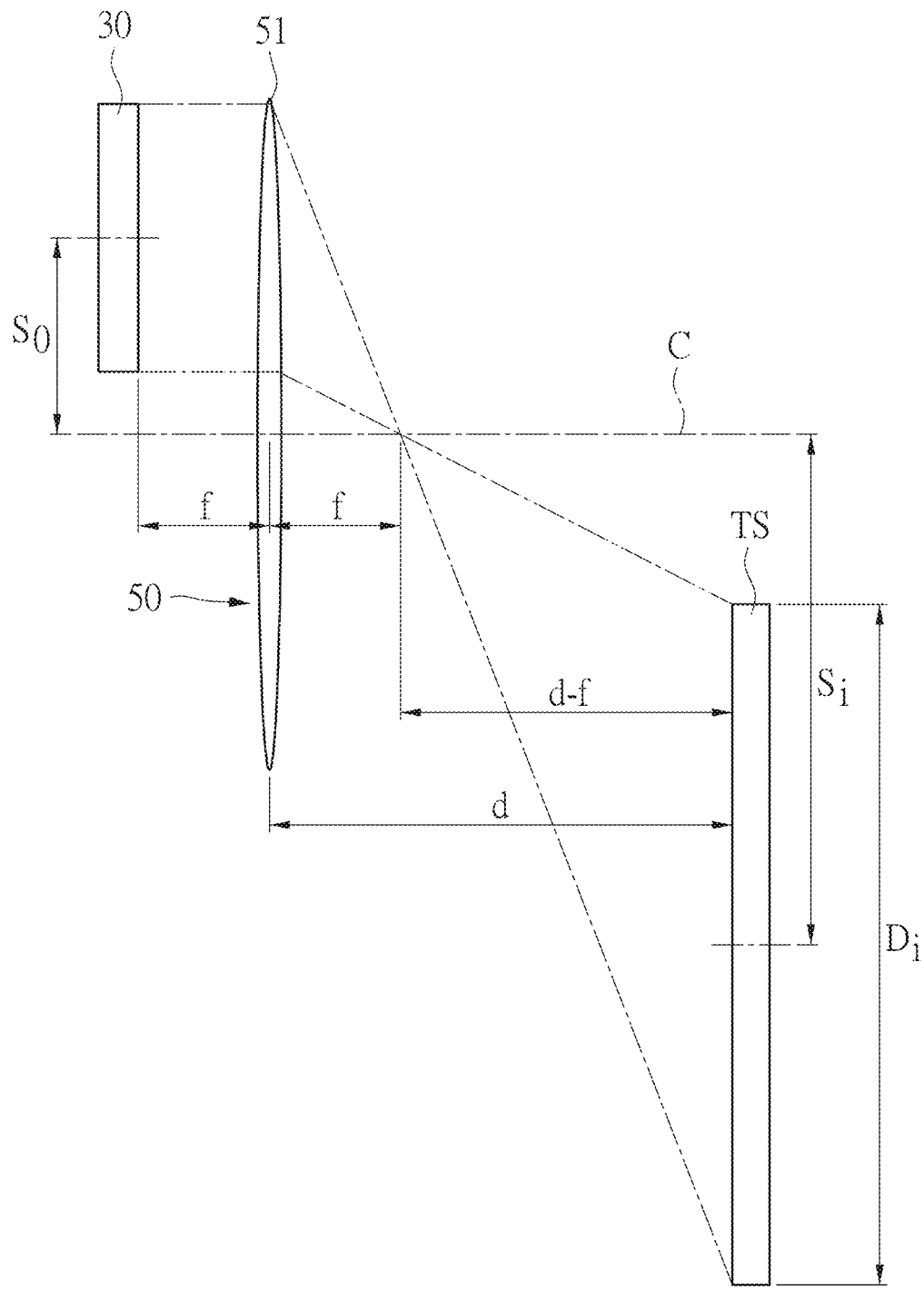
FIG. 5 is a schematic diagram showing that the center of a default projected pattern deviates from an optical axis of a lens unit in the present disclosure.

Referring to FIG. 5, the center of the default projected pattern deviates from the optical axis of the lens unit, that is, the center of the light source unit 30 having the default projected pattern deviates from the optical axis C of the projecting lens 50. In this embodiment, the optical axis C is an optical axis C of one lens unit 51. The light is projected onto the target screen TS. It is assumed that a distance $S_0$ by which the center of the light source unit 30 deviates from the optical axis C of the lens unit 51 is 1 mm. Other assumptions are identical with those in FIG. 4. By using a light-emitting chip in the size of 42 mil×42 mil as an example, $D_0$=1.067 mm; the projection distance d is 40 cm by default, d=400 mm; and the focal length f of the lens unit 51 is set to 4 mm. The size $D_i$ of the target screen TS has been calculated in FIG. 4, and is equal to 105.6 mm. As such, a distance $S_i$ by which the target screen TS deviates from the optical axis C may be calculated according to the similarity between triangles on two sides of the focal point by using the following formula:

$$S_i-(D/2)=(d-f)/f \times (S_0-D_0/2). \quad \text{Formula (2):}$$

That is, $S_i=(d-f)/f\times(S_0-D_0/2)+(D_i/2)$.

The foregoing known preset numeric values are substituted into the formula (2), to obtain:

$$S_i(400-4)/4\times(1-1.067/2)+(105.6/2)=99\times(1-0.5335)+52.8=98.18 \text{ mm}.$$

In other words, the distance $S_i$ approximates to 10 cm. According to the one-to-one correspondence between the light-emitting chips and the lenses, and with reference to the foregoing assumptions, a square image of 10 mm may be formed on the target screen TS.

Figure 6:
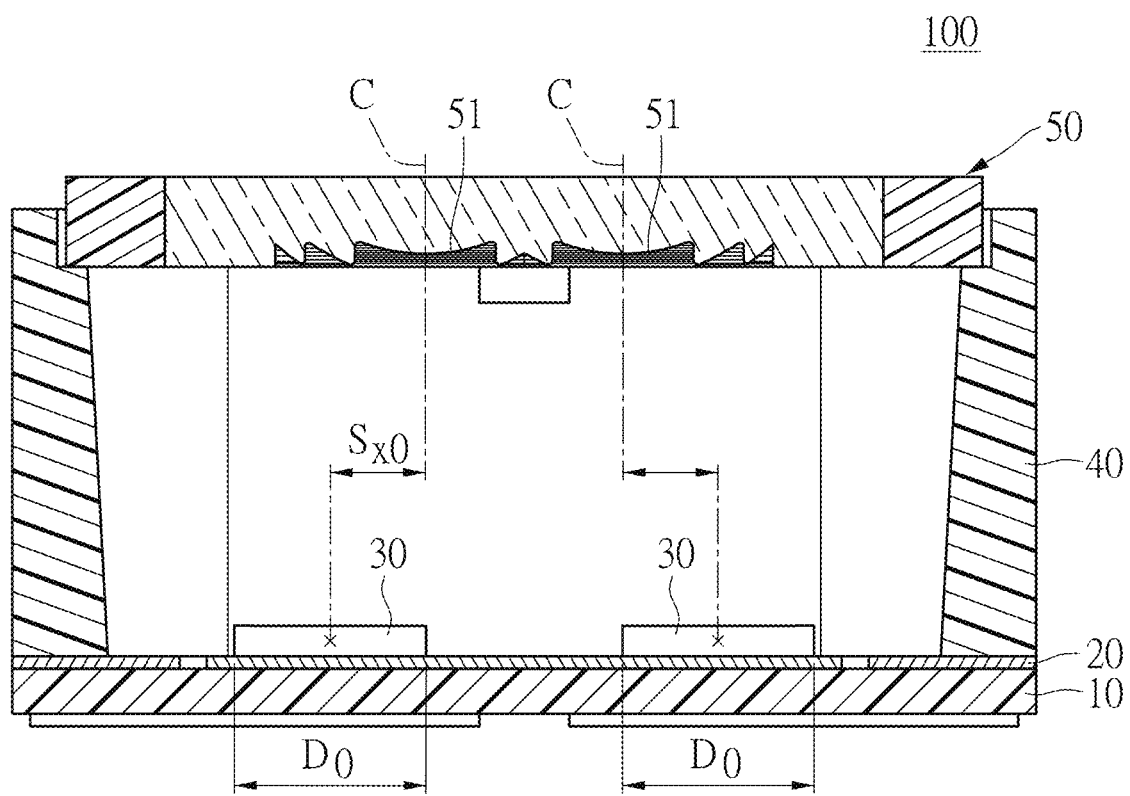
FIG. 6 is a cross-sectional view of an assembled miniaturized structured light projection module of the present disclosure.
Figure 7:
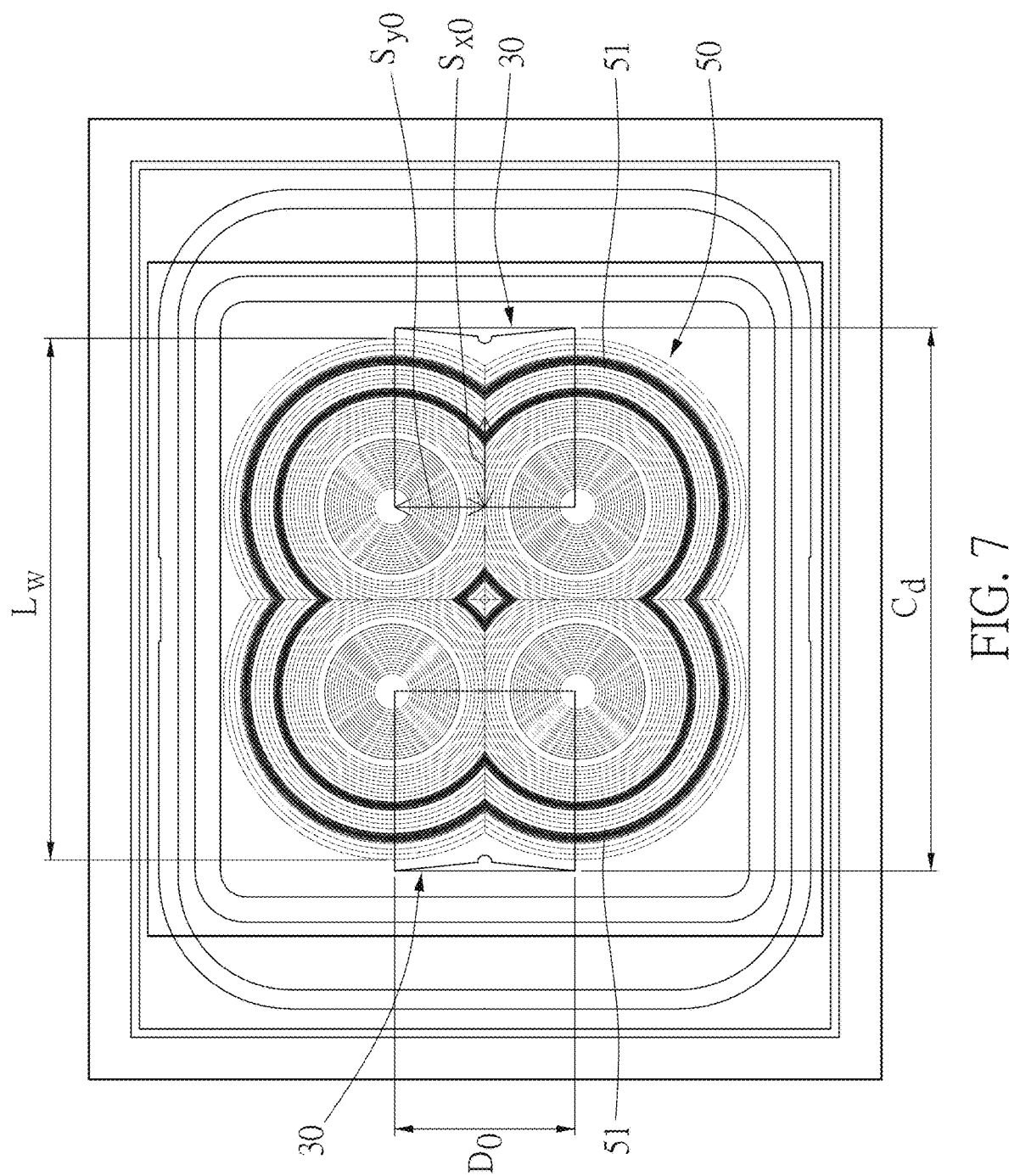
FIG. 7 is a top perspective view of the assembled miniaturized structured light projection module of the present disclosure.

FIG. 6 is a cross-sectional view of an assembled miniaturized structured light projection module of the present disclosure, and FIG. 7 is a top perspective view thereof. If one light source unit 30 corresponds to two off-axial lens units 51, an upper and lower chip pattern can be obtained. After another light source unit 30 and another two off-axial lens units 51 are symmetrically placed, the patterns are completely joined together to achieve a structured-light effect on the whole surface. The effect shows that, only when the distance in the Y-axis direction is greater than zero, a gap can be produced in the middle. However, the distance in the X-axis direction is optimally as small as possible, and overlap is caused if the distance is a negative value. In addition, if it is desired to generate lateral stripes after chip imaging, the stripes (or fingers) on the light source unit 30 also need to be horizontally set in a lateral manner.

For example, in FIG. 3A of the present disclosure, the default projected pattern of the light-emitting chip 34a in the first embodiment is formed by multiple straight and parallel stripes 341. The number of stripes projected onto the target screen TS is twice the number (n) of the stripes (denoted by the numeral 341 in FIG. 3A) plus one. In other words, the number of stripes projected onto the target screen TS is preferably 2n+1, where n is a natural number. For example, if there are nine stripes 341 on the light-emitting chip 34a, the number of stripes projected onto the target screen TS is nineteen in total. In addition, a projection point is kept as far as possible from the center of the chip, to avoid imaging a wire pad and a wire on the target screen TS.

Moreover, in FIG. 3B of the present disclosure, the default projected pattern of the light-emitting chip 34b in the second embodiment is formed by vias 343 arranged in an array and projected onto the target screen TS as black dots. The number of the black dots is four times the number (n) of the vias 343. In other words, the number of the black dots projected onto the target screen TS is 4n, where n is a natural number.

In addition, in FIG. 3C of the present disclosure, the default projected pattern of the light-emitting chip 34c in the third embodiment is formed by the apertures 345 arranged in an array, and the light-emitting chip 34c further has a conducting pad 346. The apertures 345 are projected as bright dots onto the target screen TS. The number of the bright dots is four times the number (n) of the apertures 345. In other words, the number of the bright dots projected onto the target screen TS is 4n, where n is a natural number.

Figure 8:
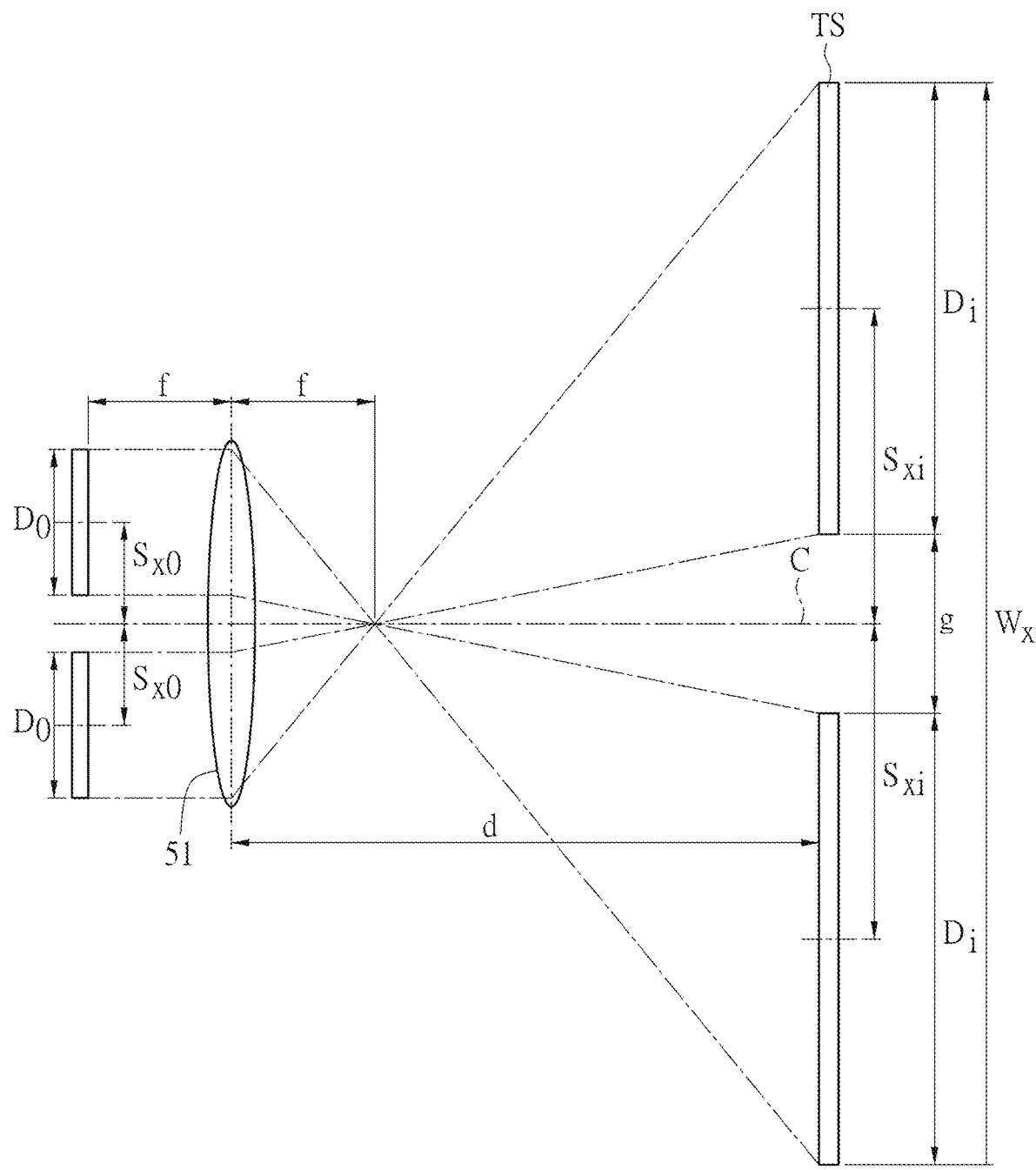
FIG. 8 is a schematic diagram showing that two light-emitting chips are projected onto a target screen.
Figure 9:
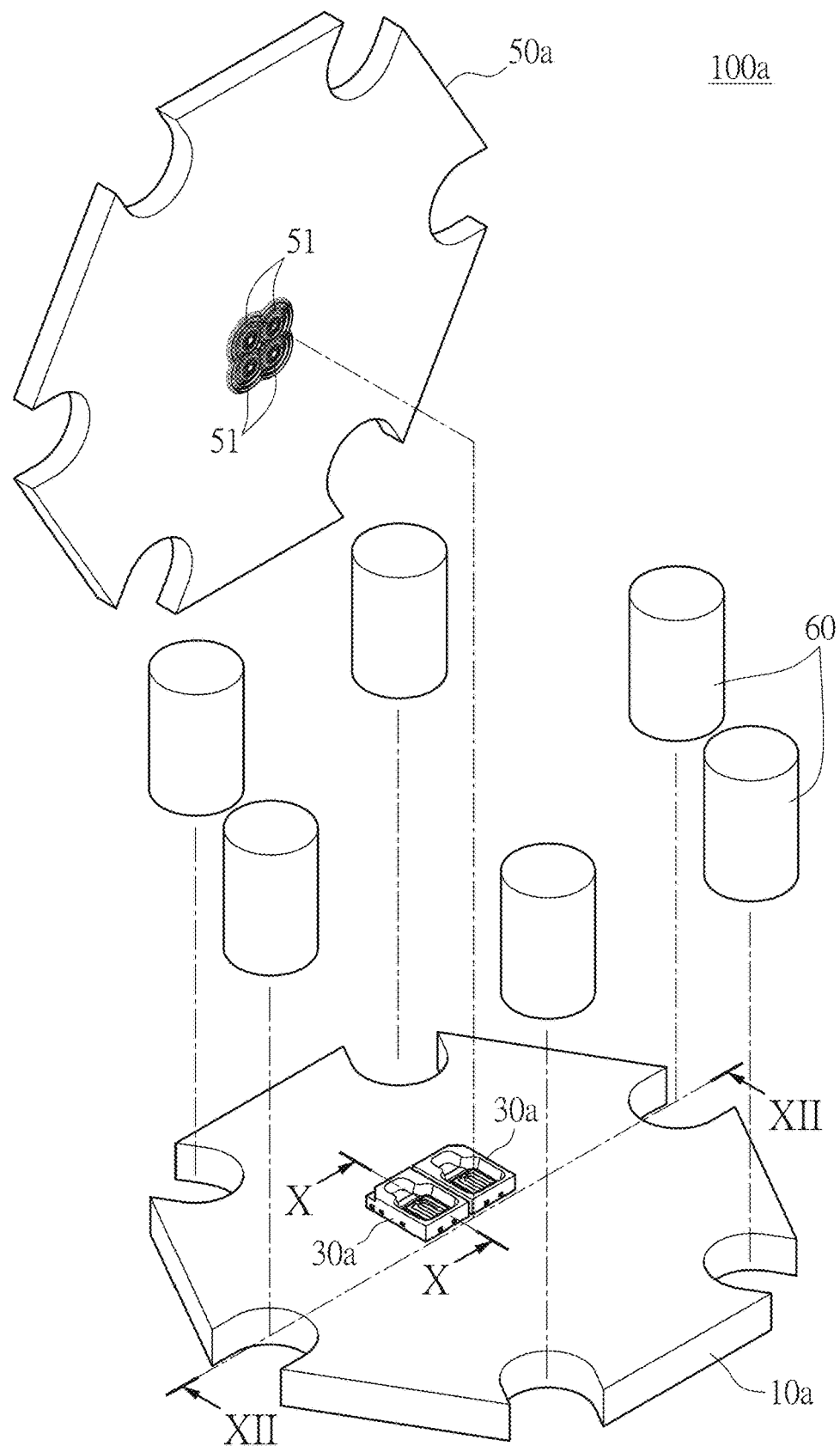
FIG. 9 is an exploded view of a miniaturized structured light projection module of the second embodiment of the present disclosure.

FIG. 8 shows that two light-emitting chips are projected onto the target screen TS. Referring to FIG. 8, the center of the default projected pattern deviates from the optical axis of the lens unit. In the present disclosure, the relationships between the field of view (FOV) of the target screen TS, the focal length f of the lens unit 51, and other parameters are described as follows. By default, the focal length of the lens unit 51 is f, the size of the light-emitting chip is $D_0$, and the distance from the lens to the target screen TS is 400 mm. The parameters are defined as follows:

$W_x$ represents the width of the target screen TS along the X axis;

$W_y$ (not shown in the drawings) represents the width of the target screen TS along the Y axis;

for the target screen TS having an aspect ratio of 4:3:

$$(\tan(FOV)\times 400)\times 2\times \tfrac{4}{5}=W_x, \text{ and}$$

$$(\tan(FOV)\times 400)\times 2\times \tfrac{3}{5}=W_y;$$

$S_{x0}$ represents a distance (which is briefly referred to as an off-axis offset) by which the center of the chip deviates from the optical axis C of the lens unit 51 along the X axis;

$S_{y0}$ represents a distance by which the center of the chip deviates from the optical axis C of the lens unit 51 along the Y axis;

$S_{xi}$ represents a distance (which is briefly referred to as an image off-axis offset) by which the center of a chip pattern deviates from the optical axis C of the lens unit 51 along the X axis; and $S_{yi}$ (not shown in the drawings) represents a distance by which the center of a chip pattern deviates from the optical axis C of the lens unit 51 along the Y axis.

In addition, it can be known from FIG. 8 that a distance g between two chip patterns is $2\times(S_i-D_i/2)$.

The width $W_x$ of the target screen TS along the X axis may be calculated by using the following formula:

$$W_x=2\times D_i-2\times(S_i-D_i/2)=3\times 2\times S_{xi} \qquad \text{Formula (3):}$$

The foregoing known preset numeric values, $D_i$ calculated by the formula (1), and S calculated by the formula (2) are substituted into formula (3), to obtain the following equation:

$$W_x=3\times(400-f)/f\times D_0)-2\times(400-f)/f)S_x0$$

The relationship between the off-axis offset and the image off-axis offset for a single chip and a single lens unit is described above.

In addition, $$W_y<3\times D_i-2\times S_{yi}=3\times((400-f)/f\times D_0-2\times(400-f)/f\, S_{y0}$$

As described above, a gap can be produced in the middle only when the distance in the Y-axis direction is greater than zero. Therefore, the following formula can be obtained:

$$S_{yi}-D_i/2>0 \qquad \text{Formula (4):}$$

In other words, a component ($S_{yi}$) of a deviation distance along the Y axis (the vertical direction) minus a half of the width ($D_i/2$) of a chip pattern is not equal to zero, where the deviation distance indicates a distance by which the center of the chip pattern projected from the light source unit 30 deviates from the optical axis C.

As described above, the distance in the X-axis direction is optimally as small as possible and overlap is caused if the distance is a negative value. Therefore, the following formula can be obtained:

$$S_{xi}-D_i/2<0 \text{ (a negative value), preferably.} \qquad \text{Formula (5):}$$

In other words, a component ($S_{xi}$) of a deviation distance along the X axis (the horizontal direction) minus a half of the width ($D_i/2$) of a chip pattern is less than or equal to zero, and preferably ranges from −1 to 0, where the deviation distance indicates a distance by which the center of the chip pattern projected from the light-emitting chip deviates from the optical axis.

The embodiments of the present disclosure have the following advantages: a projected pattern can be controlled by using a default projected pattern on the surface of a light-emitting chip or that on the surface of a package. By using a light-emitting chip in the size of 42 mil×42 mil as an example, the total width Ca of the light source units 30 connected side by side is about 5 mm, the focal length f of the lens unit 51 is 4 mm, and the whole size is about 5 mm×5 mm×5 mm. The width $L_w$ of the projecting lens 50 is about 4 mm. Moreover, since the light-emitting chips of the present disclosure are arranged in an off-axial manner, an LED flash lamp may also be placed axially. For example, the LED flash lamp may be placed between two light source units 30 in FIG. 7.

FIG. 9 to FIG. 12 show a miniaturized structured light projection module 100*a* in a second embodiment of the present disclosure. Two light source units 30*a* are disposed on a metal additional circuit board 10*a* in a hexagon shape. To match the shape of the additional circuit board 10*a*, the projecting lens 50*a* may be also hexagon-shaped. The projecting lens 50*a* is formed by four lens units 51. The projecting lens 50*a* and the additional circuit board 10*a* are fixedly connected via six connection columns 60.

Figure 10:
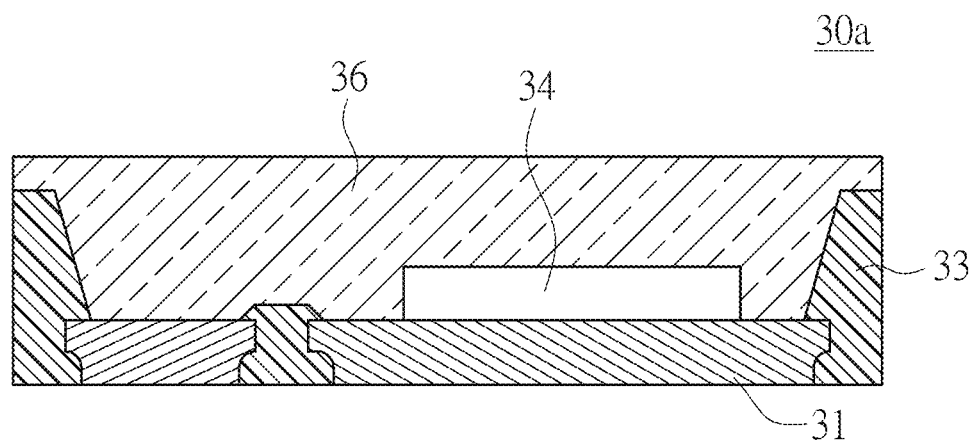
FIG. 10 is a cross-sectional view of a light source unit of the second embodiment in the present disclosure.
Figure 11:
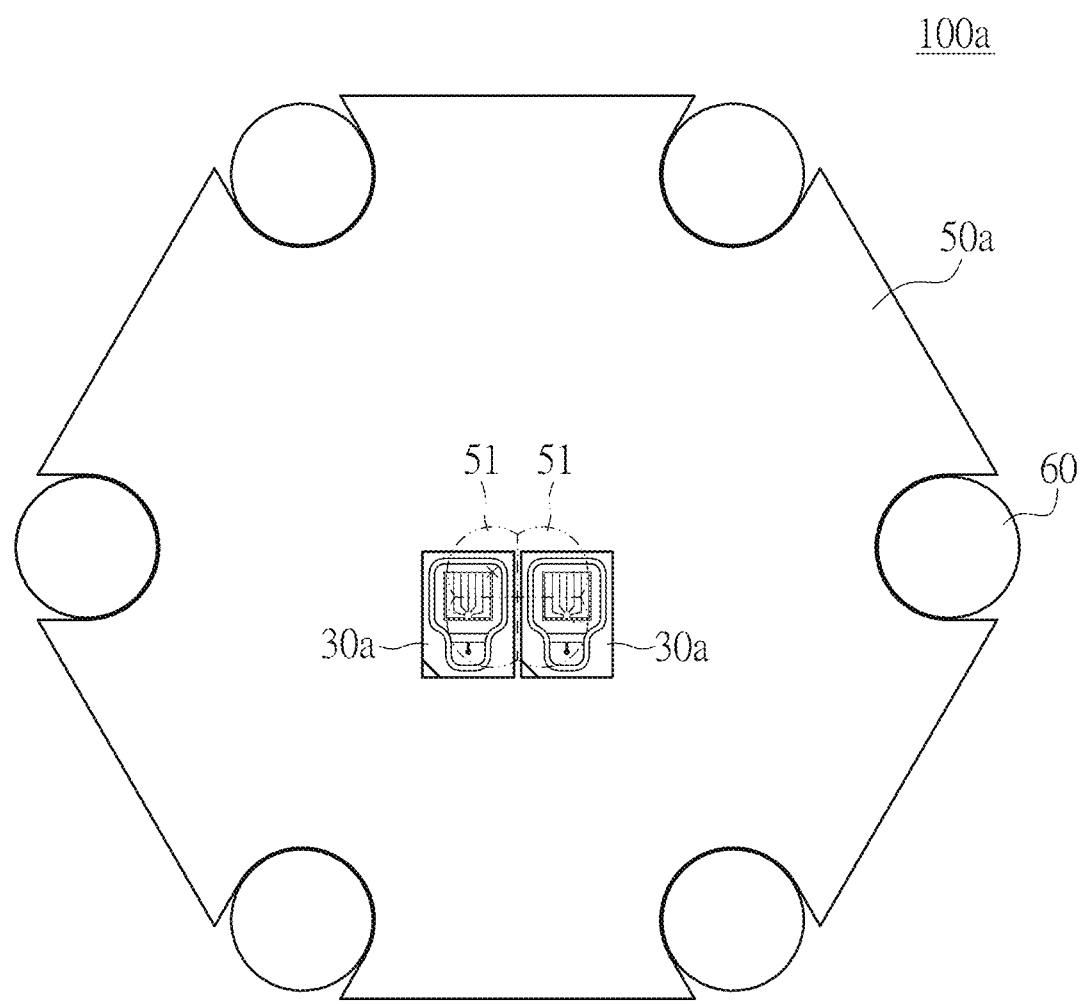
FIG. 11 is a top perspective view of an assembled miniaturized structured light projection module in the second embodiment of the present disclosure.

As shown in FIG. 10, the light source unit of the present disclosure is not limited to the foregoing embodiments. The light source unit 30*a* may include a metal support 31 and a casing 33 connected to the metal support 31, where the casing 33 may also be made from a thermosetting epoxy molding compound (EMC). The light-emitting chip 34 is disposed on the metal support 31, and a default projected pattern may be formed on the surface of a light-emitting chip 34. A package 36 is injected into the casing 33 through dispensing or a silicone encapsulation molding process and covers the light-emitting chip 34. In addition, the injected silicone needs to be flush with the top surface of the casing 33, to avoid extra aberration and deformation of a projected pattern. The refractive index of the package 36 preferably ranges from 1.4 to 1.5.

Figure 13:
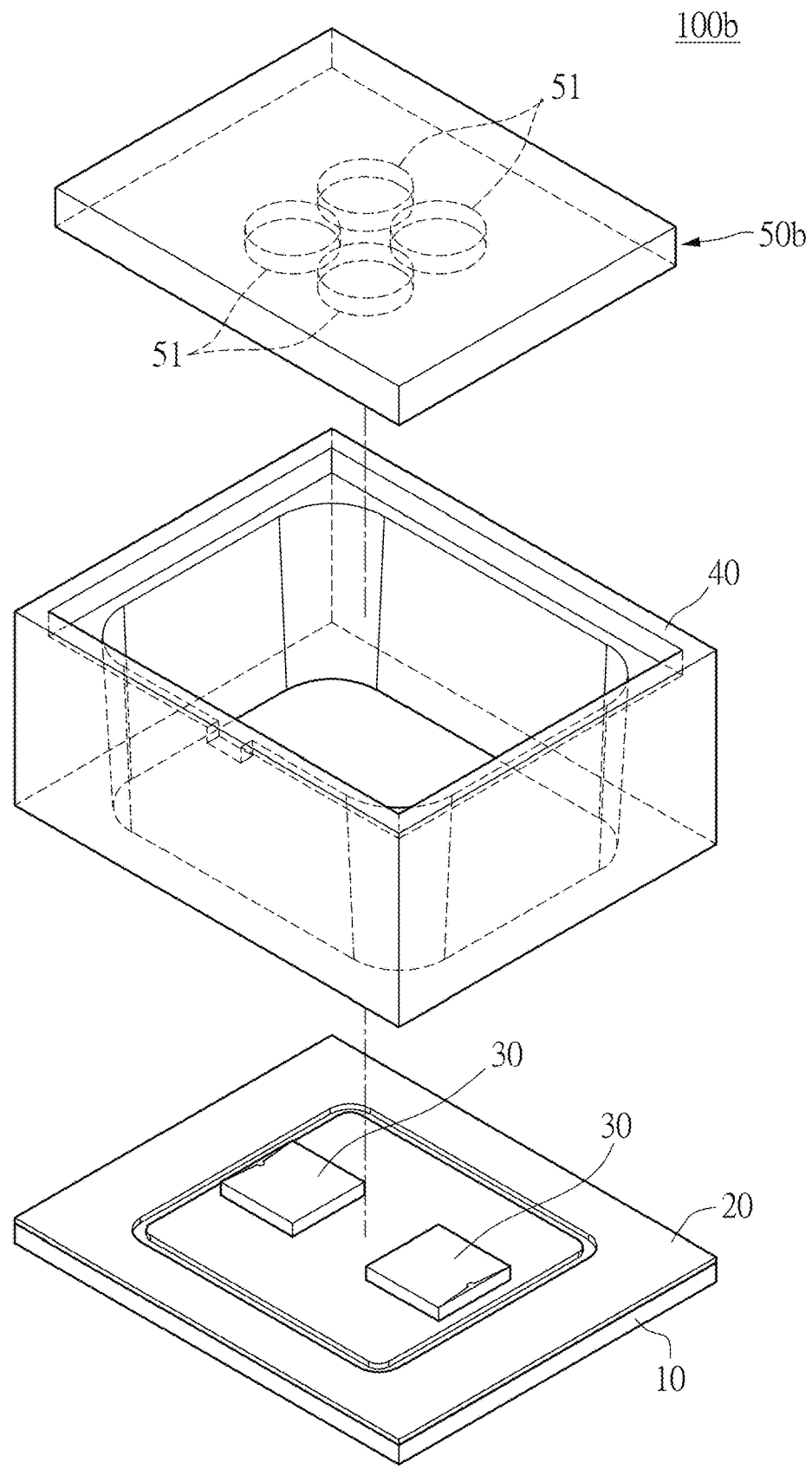
FIG. 13 is an exploded view of a third embodiment of a miniaturized structured light projection module of the present disclosure.
Figure 14:
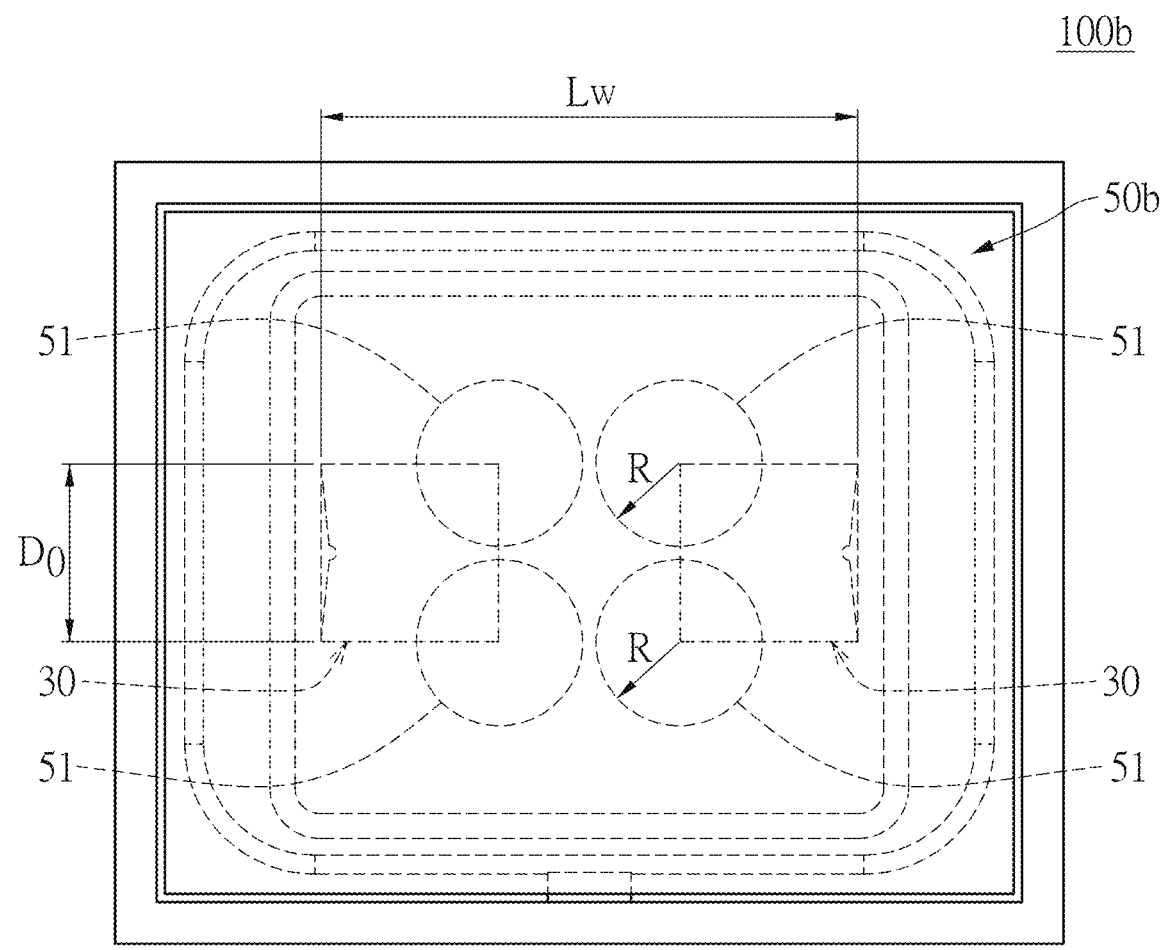
FIG. 14 is a perspective top view of an assembled miniaturized structured light projection module in the third embodiment of the present disclosure.

FIG. 13 and FIG. 14 show a miniaturized structured light projection module in a third embodiment of the present disclosure. A miniaturized structured light projection module 100*b* of this embodiment is similar to that in the first embodiment, and has two light source units 30 and four off-axial lens units 51. The difference lies in that, the four lens units 51 of the projecting lens 50*b* do not overlap with one another, and are spaced from each other at a distance, where the size $D_0$ of the light source unit 30 is greater than the diameter (which is equal to 2×R, R being the radius) of the lens unit 51.

Fourth Embodiment

Figure 12:
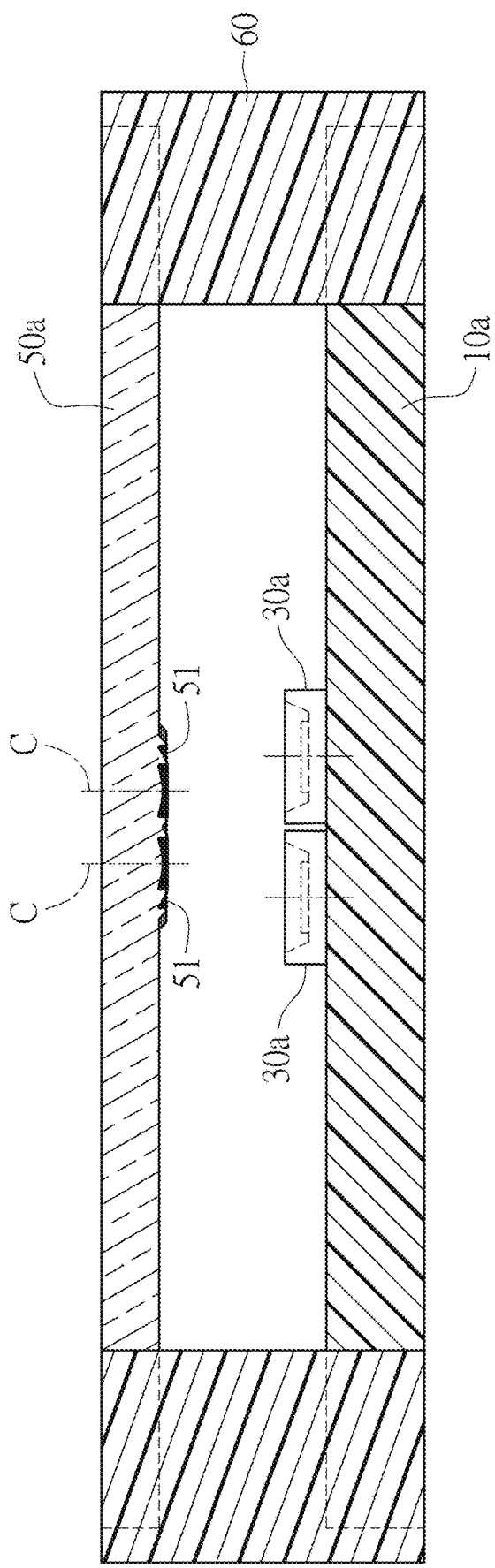
FIG. 12 is a cross-sectional view of the assembled miniaturized structured light projection module in the second embodiment of the present disclosure.
Figure 15:
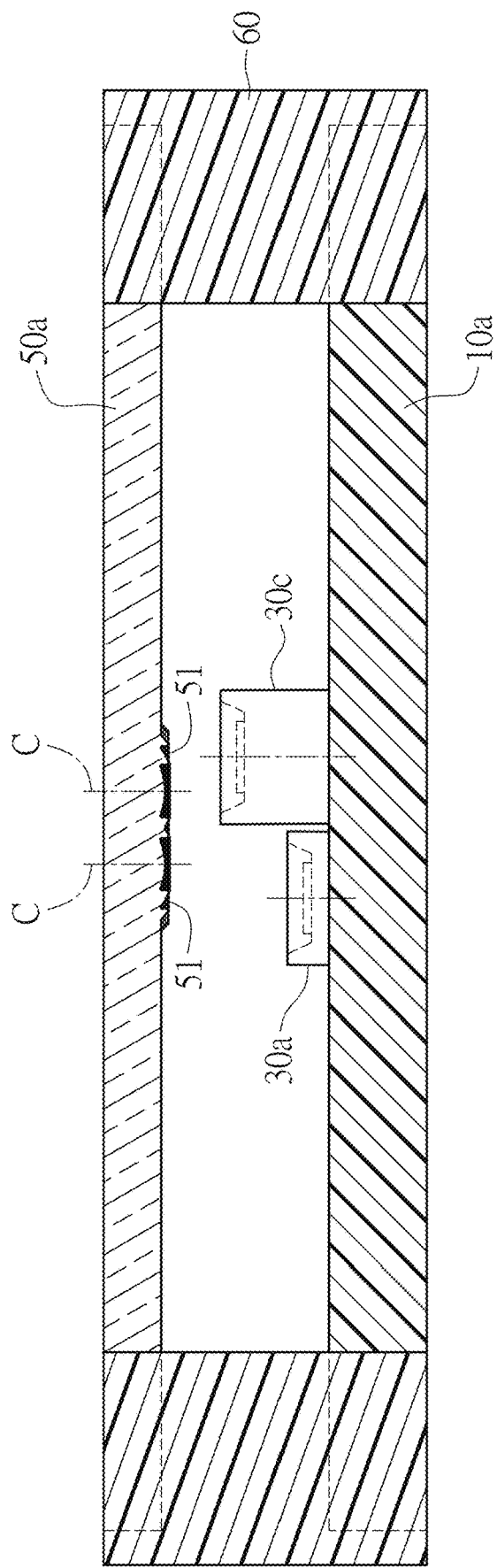
FIG. 15 is a cross-sectional view of the assembled miniaturized structured light projection module of a fourth embodiment of the present disclosure.

Referring to FIG. 15, which is a cross-sectional view of the assembled miniaturized light projection module of fourth embodiment of the present disclosure. The main difference between this embodiment and FIG. 12 is that, two light source units 30*a*, 30*c* have different height. The height of the light source unit 30*c* is higher than that of the light source unit 30*a*. Therefore, the focal plane of the lens units 51 is located on the surface of the light source unit 30*a*, but is not located on the surface of the light source unit 30*c*. In other words, an effective focal length of the lens unit 51 is equal to a distance from a bottom planar surface of the lens unit 51 to the surface of the light source unit 30*a*, so that the light source unit 30*a* can provide a structured light after passing through the lens unit 51, such as the photo shown in FIG. 21. Additionally, an effective focal length of the lens unit 51 is not equal to a distance from a bottom planar surface of the lens unit 51 to the surface of the light source unit 30*c*, so that the light source unit 30*c* cannot provide a structured light after passing through the lens unit 51, but a non-structured light as a flood lighting effect, such as the photo shown in FIG. 22. Therefore, the light source unit 30*c* can be treated as a flood illuminator. Accordingly, this embodiment simultaneously has a structured-light illuminator for three-dimensional sensing, and a flood illuminator for lighting an object, for example, a user's face.

Fifth/Sixth Embodiment

Figure 16:
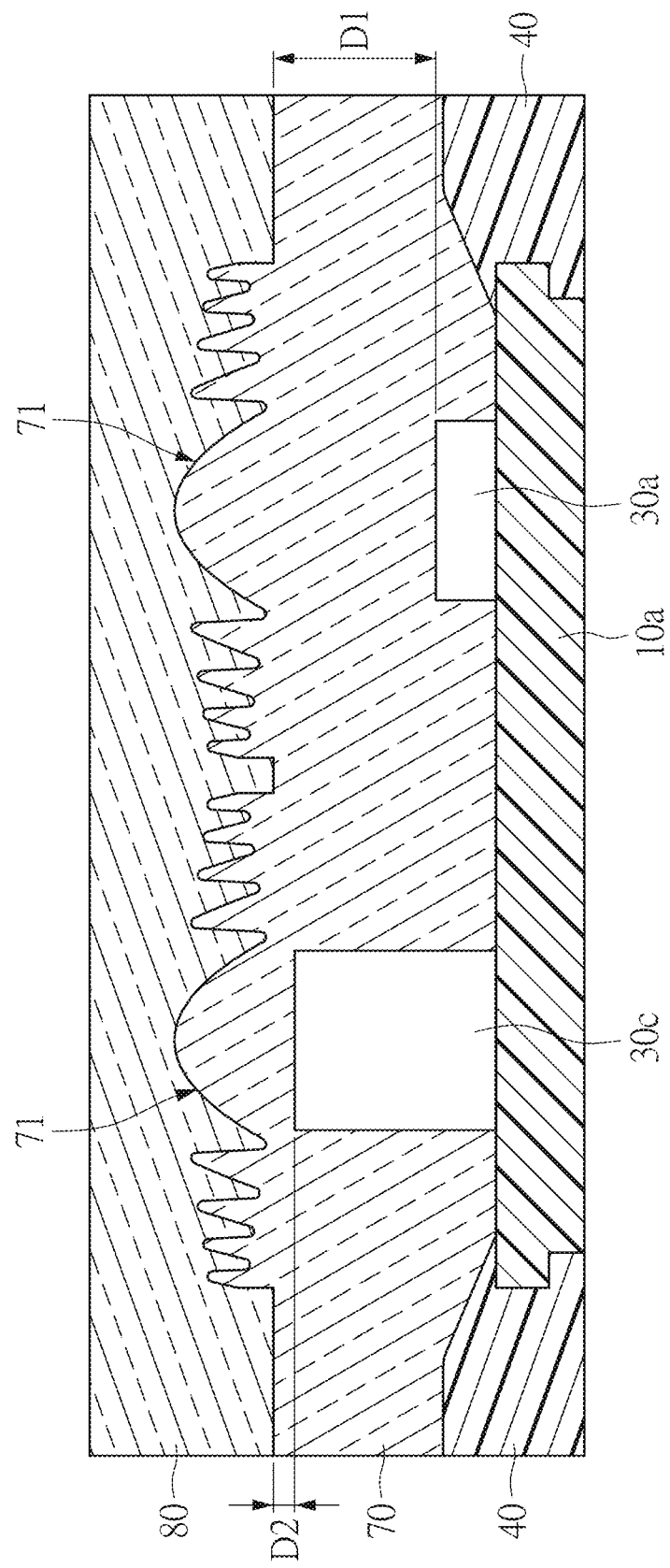
FIG. 16 is a cross-sectional view of the assembled miniaturized structured light projection module of a fifth embodiment of the present disclosure.
Figure 17:
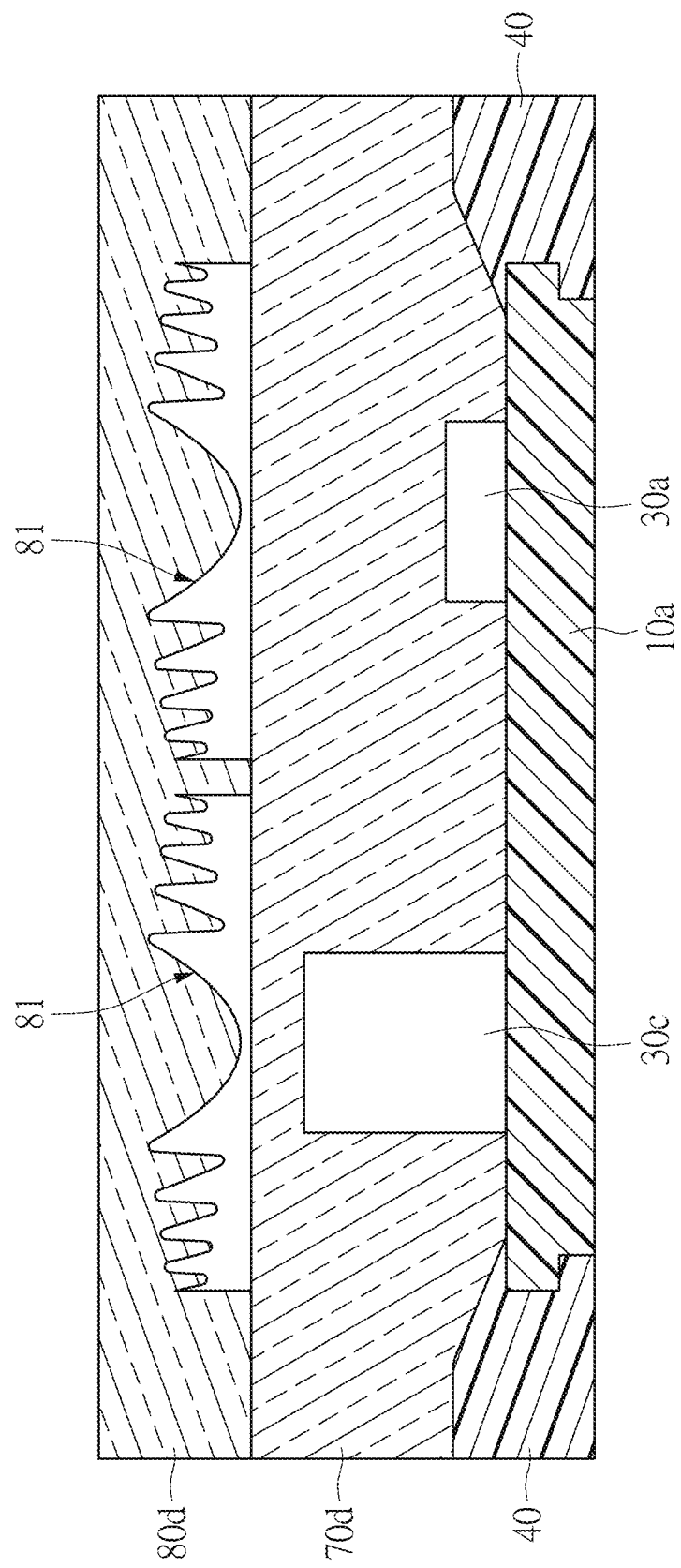
FIG. 17 is a cross-sectional view of the assembled miniaturized structured light projection module of a sixth embodiment of the present disclosure.

Referring to FIGS. 16-17, which is a cross-sectional view of the assembled miniaturized structured light projection module of a fifth/sixth embodiment of the present disclosure. Two light source units 30*a*, 30*c* with different heights are disposed on the additional circuit board 10*a*. Different from the above embodiment, these two embodiments respectively have a first encapsulation layer 70, 70*d* with a refractive index different that of air, which is filled on the top surface of the additional circuit board 10*a*. The material of the first encapsulation layer 70, 70*d* can be, for example, epoxy resin, and can be added with other material for adjusting the refractive index of the first encapsulation layer 70, 70*d*. As shown in FIG. 16, a top surface of the first encapsulation layer 70 is protruded with two lens units 71. As shown in FIG. 17, the first encapsulation layer 70*d* has a planar top surface. These two embodiments respectively have two lens units 71, 81 which are disposed on the top surface of the first encapsulation layer 70, 70*d*. As shown in FIG. 16, the lens unit 71 can be simultaneously formed with the first encapsulation layer 70 by a molding process on the additional circuit board 10*a*, which has advantages that it does not need assembly process, and the structure is more accurate. The lens units 71, 81 therefore can be accurately mated with the light source units 30*a*, 30*c*. These two embodiments further respectively include a second encapsulation layer 80, 80*d*, which is formed on the top surface of the first encapsulation layer 70, 70*d* can cover the lens units 71, 81. The second encapsulation layer 80, 80*d* is also preferably made by the molding process. As shown in FIG. 17, two lens units 81, 83 can be simultaneously formed with the second encapsulation layer 80*d* by molding process. The second encapsulation layer 80, 80*d* has a planar surface. In these embodiments, the second encapsulation material of the second encapsulation layer 80, 80*d* is different from the first encapsulation material of the first encapsulation layer 70, 70*d*. In detail, by different encapsulation materials, this embodiment designs a refractive index (n2) of the second encapsulation layer 80, 80*d* being greater than a refractive index (n1) of the first encapsulation layer 70, 70*d*.

According to the formula: F=KR, wherein K=n1/(n2−n1), $$F=(n1/(n2-n1))*R$$

F is an effective focal length of the lens unit. R is a radius of curvature of the lens unit, which is the radius of curvature of Fresnel lens in this embodiment. In this embodiment, F is constituted by the refractive index of the encapsulation body of the light source unit (referring to the package 36 covered on the light-emitting chip 34 as shown in FIG. 2), the refractive index of the first encapsulation layer 70,70*d* and the radius of curvature of the lens unit 71, 81.

n1 is the refractive index of the first encapsulation material, which is the refractive index of the first encapsulation layer 70, 70*d* in this embodiment.

n2 is the refractive index of the second encapsulation material, which the refractive index of the second encapsulation layer 80, 80*d* in this embodiment.

Referring to FIG. 16, in this embodiment, the refractive index n2 is greater than the refractive index n1, so that a value of n2−n1 is positive, but the present disclosure is not limited thereto. A distance from the top surface of the light source unit to a lower surface of the lens unit 71, 81 is D.

According to the above formula, this embodiment is taken with an example as follows. To suppose the lens unit 71, 81 is designed that a radius of curvature R=1.55 mm, the refractive index n1 of the first encapsulation layer 70, 70$d$ is 1.35 (which is equal to that of the light source unit (30$a$, 30$c$)), the refractive index n2 of the second encapsulation layer 80, 80$d$ is 1.71.

$$F=(1.35/(1.71-1.35))\times 0.155=0.20925/0.36\approx 0.58 \text{ (mm)}$$

An effective focal length is approximately equal to 0.58 mm according to the above formula. When the effective focal length is equal to the distance D between the illuminating surface of the light source unit and a lower surface of the lens unit, the present disclosure can provide a structured light according to the projected pattern on the upper surface of the light-emitting chip or that on the upper surface of a package. In other words, the distance D1 between the illuminating surface of the light source unit 30$a$ and the lower surface of the lens unit 71, 81 is equal to the effective focal length, so that the light source unit 30$a$ projects a structured light. The D2 between the illuminating surface of the light source unit 30$c$ and the lower surface of the lens unit 71, 81 is not equal to the effective focal length, so that the light source unit 30$c$ projects a flood light.

The total thickness or height of the miniaturized structured light projection module of this embodiment is contributed by three components, which includes a thickness of the light source units (30$a$, 30$c$), a thickness of the first encapsulation layer 70, 70$d$, and a thickness of the second encapsulation layer 80, 80$d$. Therefore, the embodiment can conveniently provide structured light or flood light by adjusting the thickness of the lens unit, or the thickness of the light source unit or the light-emitting chip, as a flood illuminator, or a structured-light illuminator.

Sixth Embodiment

Figure 18:
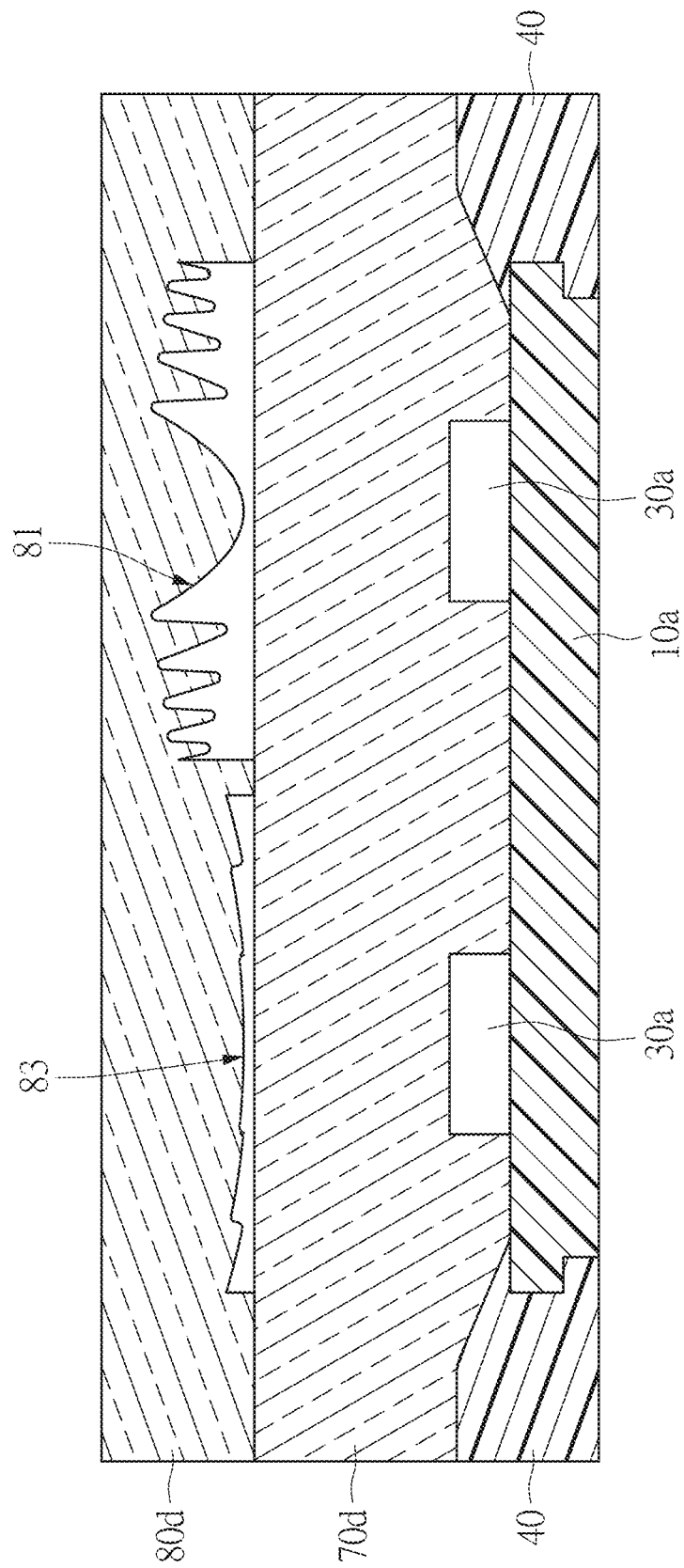
FIG. 18 is a cross-sectional view of the assembled miniaturized structured light projection module of a seventh embodiment of the present disclosure.

Referring to FIG. 17, which is a cross-sectional view of the assembled miniaturized structured light projection module of a sixth embodiment of the present disclosure. The first encapsulation layer 70$d$ has a planar top surface and a planar bottom surface, and has no lens unit. This embodiment has a second encapsulation layer 80$d$ disposed on the top surface of the first encapsulation layer 70$d$, two lens units 81 are formed on the bottom surface of the second encapsulation layer 80$d$ in a concaved manner. Two lens units 81 can be simultaneously formed on the bottom surface of the second encapsulation layer 80$d$ by the molding process. The second encapsulation layer 80$d$ is covered on the first encapsulation layer 70$d$, and the two lens units 81 are configured to correspond with the light source unit 30$a$, 30$c$, respectively. Referring to FIG. 18, which is a cross-sectional view of the assembled miniaturized structured light projection module of seventh embodiment of the present disclosure. Most of this embodiment is similar to the above embodiments. The main difference from the above embodiments is that, the two light source units 30$a$ on additional circuit board 10$a$ have identical height. Two lens units 81, 83 are formed on the bottom surface of the second encapsulation layer 80$d$ in a concave manner, and have different radius of curvature. In this embodiment, a radius of curvature of the lens unit 83 is larger than a radius of curvature of the lens unit 81. Two lens units 81, 83 can be simultaneously formed with the second encapsulation layer 80$d$ by molding process. The second encapsulation layer 80$d$ is covered on the first encapsulation layer 70$d$. The lens units 81, 83 are arranged to align with the light source units 30$a$, respectively. The second encapsulation layer 80 has a planar top surface. In this embodiment, the second encapsulation material of the second encapsulation layer 80$d$ is different from the first encapsulation material of the first encapsulation layer 70$d$, so as to provide different refractive index. The features of this embodiment are that, by adjusting the radius of curvature of the lens unit, so that the light source unit 30$a$ corresponding to the lens unit 81 projects structured light, and the other light source unit 30$a$ corresponding to the lens unit 83 can provide flood light.

Figure 19:
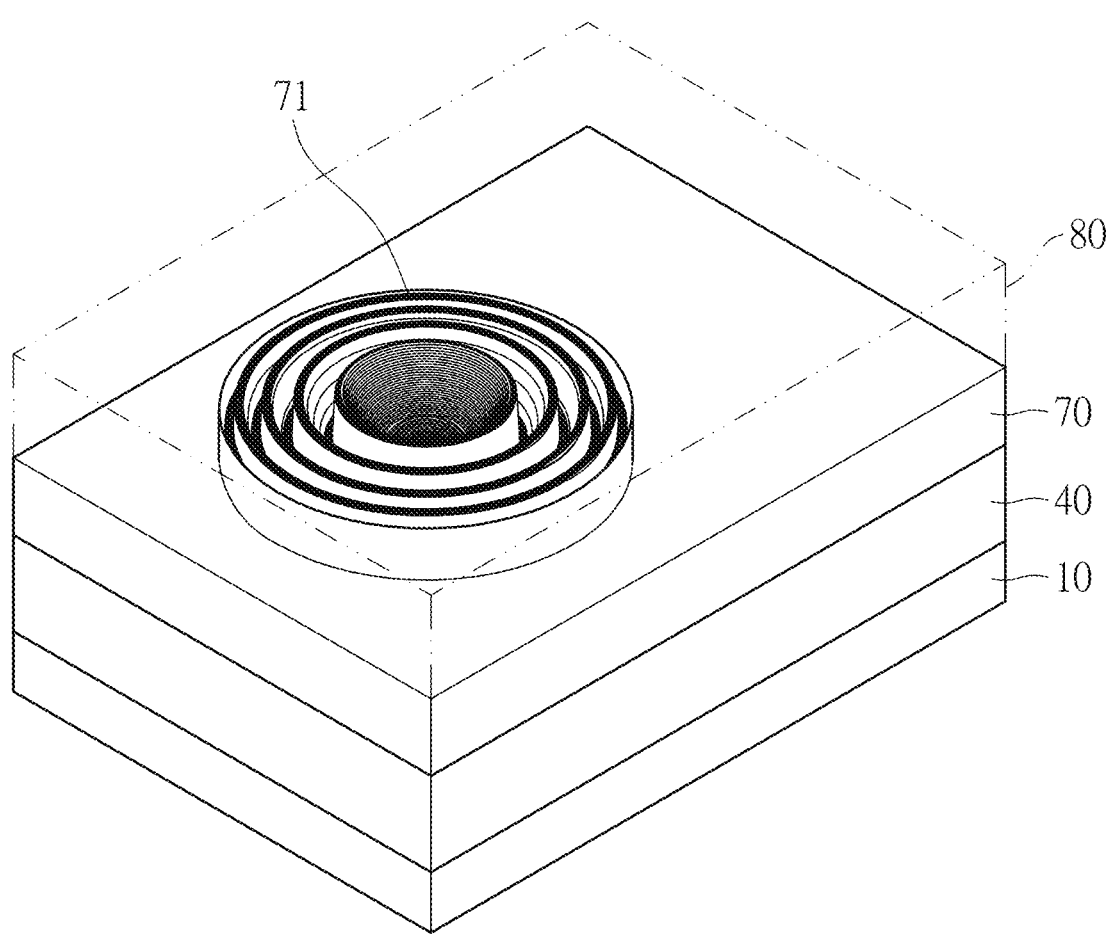
FIG. 19 is an assembled perspective view of a miniaturized light projection module with one single light source unit according to the present disclosure.
Figure 20:
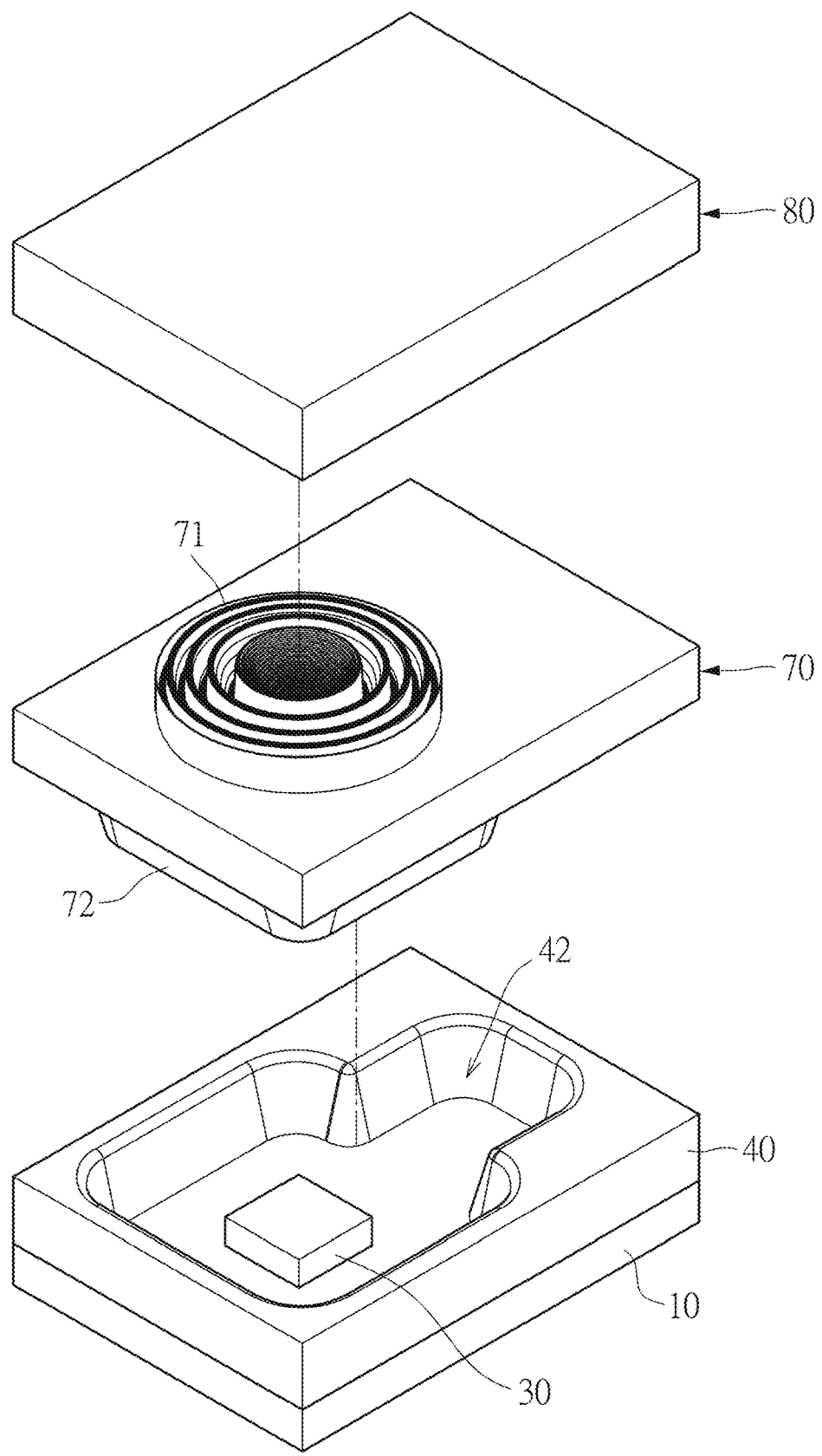
FIG. 20 is an exploded perspective view of the miniaturized light projection module of FIG. 19 according to the present disclosure.

Referring to FIG. 19 and FIG. 20, the light projection module of the present disclosure can be equipped with one single light source unit. In other words, the present disclosure can provide a light projection module, which includes an additional circuit board 10, a reflection casing 40 formed on the additional circuit board 10, a first encapsulation layer 70, a second encapsulation layer 80. The light source unit 30 is disposed on the additional circuit board 10. The reflection casing 40 is formed with a receiving space 42. The first encapsulation layer 70 has a lens unit 71 protrudes from a top surface thereof, and a filling portion 72 protrudes from a bottom surface thereof for filling the receiving space 42.

Figure 21:
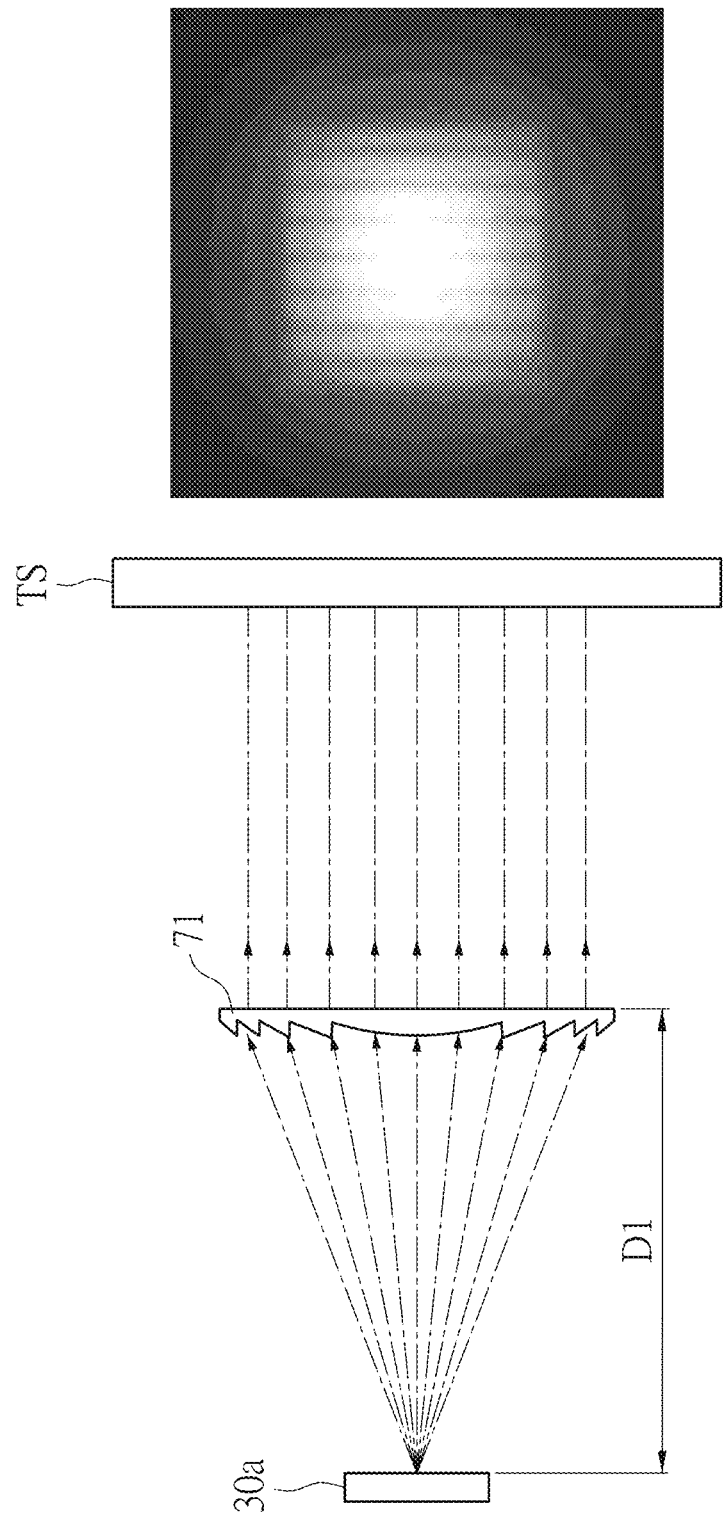
FIG. 21 is a schematic view of a light projection module projecting a structured light on a target screen according to the present disclosure.
Figure 22:
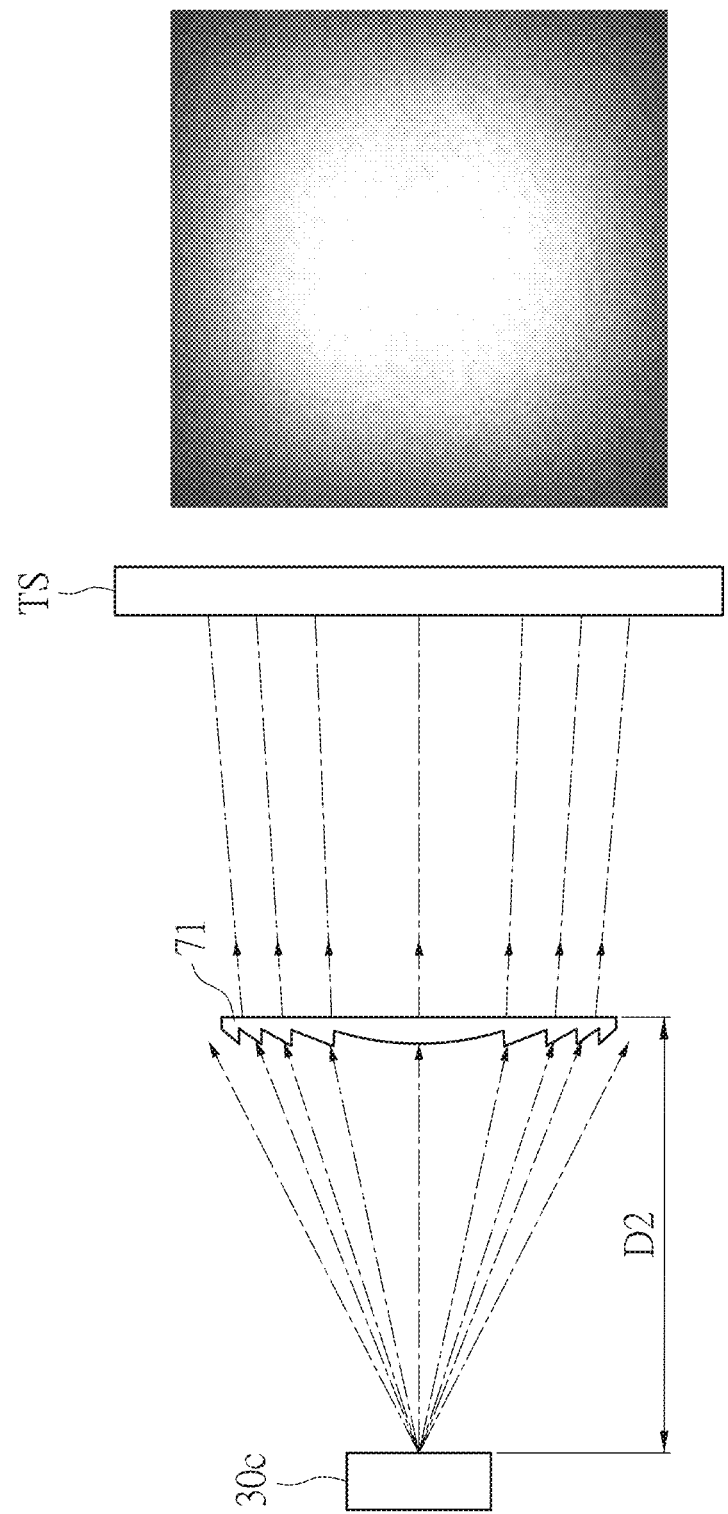
FIG. 22 is a schematic view of a light projection module projecting a non-structured light on a target screen according to the present disclosure.

Referring to FIG. 21 and FIG. 22, the present disclosure can provide a structured light as shown in FIG. 21 or a non-structured light as a flood lighting effect as shown in FIG. 22, by adjusting the focal plane of the lens unit to be located on the surface of the light source unit 30 or not on the surface of the light source unit 30. In detail, the present disclosure can adjust the height of light source unit, or the effective focal length of the lens unit. According to FIG. 21, the distance D1 is equal to the effective focal length of the lens unit 71, so that the light source unit 30 projects a structured light on the target screen TS. According to FIG. 22, the distance D2 is not equal to the effective focal length of the lens unit 71, so that the light source unit 30 projects a non-structured light on the target screen TS as a flood lighting effect.

To sum up, the present disclosure is characterized in that, a miniaturized structured light projection module of the present disclosure can adjust and control a projected pattern on the upper surface of the light-emitting chip or that on the upper surface of a package, and further use lens units arranged in an array, to produce structured light. The focal plane of the lens is the upper surface of the light-emitting chip or the upper surface of the package. A chip structure or a packaged structure adjusts and controls the projected pattern. The present disclosure does not require an additional grating to form a default projected pattern, and thus the size can be reduced. Thus, the whole size of the miniaturized structured light projection module can be reduced, such that the module can be disposed in a portable electronic product.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A miniaturized structured light projection module, comprising:
a light source assembly, having a plurality of light source units, each of the light source units being a light-emitting chip or a light-emitting package structure having a package, each of the light source units forming a default projected pattern on a surface of the light-emitting chip or a surface of the package; and
a projecting lens, disposed above the light source units and formed with a plurality of lens units, wherein the lens units are arranged in an array and mutually connected, the projecting lens has a front focal plane, and at least one of the default projected patterns of the light source units is disposed on the front focal plane of the projecting lens,
wherein a center of the default projected pattern of the light source unit deviates from an optical axis of the lens unit;
wherein a component of a deviation distance along a vertical direction minus a half of the width of the default projected pattern is not equal to zero, and the deviation distance indicates a distance by which a center of the default projected pattern projected from the light source unit deviates from the optical axis;
wherein, when the default projected pattern on the surface of the light-emitting chip, a distance between the surface of the light-emitting chip and the projecting lens being equal to a front focal length; or wherein, when the default projected pattern on the surface of the package, a distance between the surface of the package and the projecting lens being equal to a front focal length, so that a light emitting from the light-emitting chip through the default projected patterns to form a structured light by the projecting lens.

2. The miniaturized structured light projection module of claim 1, wherein the light source unit further includes a substrate, the light-emitting chip is disposed on the substrate, and the package covers the substrate and the light-emitting chip.

3. The miniaturized structured light projection module of claim 2, wherein the default projected pattern has a plurality of straight and parallel stripes, the width of each stripe ranges from 0.02 mm to 0.08 mm, a spacing between any adjacent two centers of the stripes ranges from 0.04 mm to 0.16 mm, and the number of stripes projected onto a target screen is twice the number of the stripes plus one.

4. The miniaturized structured light projection module of claim 2, wherein the default projected pattern has a plurality of vias arranged in an array, the diameter of each via ranges from 0.02 mm to 0.08 mm, a spacing between any adjacent two centers of the vias ranges from 0.04 mm to 0.16 mm, and the number of black dots projected onto a target screen is four times the number of the vias.

5. The miniaturized structured light projection module of claim 2, wherein the light-emitting chip is a vertical-cavity surface-emitting laser (VCSEL) structure; multiple apertures are formed on a metal electrode of the light-emitting chip, such that a laser is emitted out of these apertures; and the number of light dots projected onto a target screen is four times more than that of the apertures.

6. The miniaturized structured light projection module of claim 1, wherein the light source unit further includes a substrate, the light-emitting chip is disposed on the substrate, the package covers the substrate and the light-emitting chip, and the default projected pattern is printed on the surface of the package.

7. The miniaturized structured light projection module of claim 6, wherein the default projected pattern has a plurality of straight and parallel stripes, the width of each stripe ranges from 0.02 mm to 0.08 mm, a spacing between any adjacent two centers of the stripes ranges from 0.04 mm to 0.16 mm, and the number of stripes projected onto a target screen is twice the number of the stripes plus one.

8. The miniaturized structured light projection module of claim 6, wherein the default projected pattern has a plurality of vias arranged in an array, the diameter of each via ranges from 0.02 mm to 0.08 mm, a spacing between any adjacent two centers of the vias ranges from 0.04 mm to 0.16 mm, and the number of black dots projected onto a target screen is four times the number of the vias.

9. The miniaturized structured light projection module of claim 6, wherein the light-emitting chip is a VCSEL structure; a metal electrode of the light-emitting chip is formed with a plurality of apertures to allow a laser to be emitted; and the number of light dots projected onto a target screen is four times the number of the apertures.

10. The miniaturized structured light projection module of claim 1, wherein the default projected patterns of the light source units and the lens units are coaxially arranged in a one-to-one correspondence manner.

11. The miniaturized structured light projection module of claim 1, wherein a component of a deviation distance along a horizontal direction minus a half of the width of the default projected pattern is less than or equal to zero, and the deviation distance indicates a distance by which the center of the default projected pattern projected from the light source unit deviates from the optical axis.

12. The miniaturized structured light projection module of claim 1, wherein a flash lamp unit is further placed on the optical axis.

13. The miniaturized structured light projection module of claim 1, wherein two of the light source units have different heights under the projecting lens, one of the light source units projects a structured light, and another one of the light source units projects a flood light.

14. The miniaturized structured light projection module of claim 1, wherein two of the lens units of the projecting lens have different radius of curvature corresponding to two of the light source units with identical height, one of the light source units projects a structured light through one of the lens units, and another one of the light source units projects a flood light through another one of the lens units.

15. The miniaturized structured light projection module of claim 1, further comprising an additional circuit board, a first encapsulation layer and a second encapsulation layer, wherein the light source units are disposed on the additional circuit board, the first encapsulation layer is formed on the additional circuit board and covers the light source units, the second encapsulation layer is formed on the first encapsulation layer, and the lens units are formed on the first encapsulation layer or the second encapsulation layer.

16. The miniaturized structured light projection module of claim 15, wherein two of the light source units have different heights and two of the lens units have identical radius of curvature correspondingly aligned with each other, one of the light source units projects a structured light, and another one of the light source units projects a flood light, wherein a refractive index of the first encapsulation layer is different from a refractive index of the second encapsulation layer.

17. The miniaturized structured light projection module of claim 15, wherein two of the light source units have identical heights and two of the lens units have different radius of curvature correspondingly aligned with each other, one of the light source units projects a structured light, and another one of the light source units projects a flood light, wherein a refractive index of the first encapsulation layer is different from a refractive index of the second encapsulation layer.

18. A miniaturized structured light projection module, comprising:
- a light source assembly, having a plurality of light source units, each of the light source units forming a default projected pattern on a surface thereof; and
- a projecting lens, disposed above the light source units and formed with a plurality of lens units, wherein the lens units are arranged in an array and mutually connected, the projecting lens has a front focal plane, and at least one of the default projected patterns of the light source units is disposed on the front focal plane of the projecting lens, so as to project a structured light;
- wherein two of the lens units of the projecting lens have different radius of curvature corresponding to two of the light source units with identical height, one of the light source units projects a structured light through one of the lens units, and another one of the light source units projects a flood light through another one of the lens units.

* * * * *